(12) United States Patent  
Eguchi

(10) Patent No.: US 8,174,774 B2  
(45) Date of Patent: May 8, 2012

(54) ZOOM LENS SYSTEM

(75) Inventor: Masaru Eguchi, Saitama (JP)

(73) Assignee: Hoya Corporation, Tokyo (JP)

( * ) Notice: Subject to any disclaimer, the term of this patent is extended or adjusted under 35 U.S.C. 154(b) by 139 days.

(21) Appl. No.: 12/823,451

(22) Filed: Jun. 25, 2010

(65) Prior Publication Data

US 2010/0328784 A1    Dec. 30, 2010

(30) Foreign Application Priority Data

Jun. 30, 2009  (JP) .................................. 2009-154569

(51) Int. Cl.  
    G02B 15/14  (2006.01)
(52) U.S. Cl. ........................................................ 359/687
(58) Field of Classification Search .................. 359/683, 359/687, 774

See application file for complete search history.

(56) References Cited

U.S. PATENT DOCUMENTS

| | | | |
|---|---|---|---|
| 5,859,729 A * | 1/1999 | Misaka ......................... | 359/686 |
| 7,283,310 B2 | 10/2007 | Hozumi et al. | |
| 7,417,800 B2 | 8/2008 | Saori | |
| 7,420,745 B2 | 9/2008 | Ohashi | |
| 7,450,316 B2 | 11/2008 | Morooka | |
| 7,460,312 B2 | 12/2008 | Nakamura et al. | |
| 7,489,452 B2 | 2/2009 | Yamamoto et al. | |
| 7,508,594 B2 | 3/2009 | Saori | |
| 7,522,349 B2 * | 4/2009 | Eguchi ......................... | 359/687 |
| 7,538,953 B2 | 5/2009 | Enomoto | |
| 7,538,954 B2 | 5/2009 | Enomoto | |
| 7,609,456 B2 | 10/2009 | Saori | |
| 7,777,965 B2 | 8/2010 | Eguchi | |
| 7,791,819 B2 | 9/2010 | Eguchi | |
| 7,804,652 B2 | 9/2010 | Saori | |
| 7,808,720 B2 | 10/2010 | Eguchi | |
| 7,813,051 B2 | 10/2010 | Saori | |
| 2009/0244719 A1 | 10/2009 | Nakamura et al. | |
| 2009/0257132 A1 | 10/2009 | Hayakawa et al. | |
| 2009/0273849 A1 | 11/2009 | Nakamura et al. | |
| 2010/0128364 A1 | 5/2010 | Agatsuma | |
| 2010/0195215 A1 | 8/2010 | Saori | |
| 2010/0195219 A1 | 8/2010 | Kato | |

FOREIGN PATENT DOCUMENTS

| | | |
|---|---|---|
| JP | 2006-23529 | 1/2006 |
| JP | 2006-308957 | 11/2006 |
| JP | 2008-112013 | 5/2008 |

OTHER PUBLICATIONS

U.S. Appl. No. 12/780,008, filed May 14, 2010, Yasuo Kanazashi.  
U.S. Appl. No. 12/783,612, filed May 20, 2010, Masakazu Saori.

* cited by examiner

*Primary Examiner* — Joseph P Martinez  
(74) *Attorney, Agent, or Firm* — Greenblum & Bernstein P.L.C.

(57) ABSTRACT

A zoom lens system includes a positive first lens group, a negative second lens group, a positive third lens group, and a positive fourth lens group, in this order from the object. Upon zooming from the short focal length extremity to the long focal length extremity, all of the first through fourth lens groups move along the optical axis. The zoom lens system satisfies the following condition: $3<T1/F2<4$ ... (1) wherein T1 designates the traveling distance of the first lens group upon zooming from the short focal length extremity to the long focal length extremity; and F2 designates the focal length of the second lens group.

7 Claims, 31 Drawing Sheets

ZOOM LENS SYSTEM

BACKGROUND OF THE INVENTION

1. Field of the Invention

The present invention relates to a zoom lens system, which has a half angle-of-view of 35 degrees or more covering a wide-angle area, is ideal as an imaging optical system mainly for an image sensor.

2. Description of Related Art

In recent years, the demands of zoom lens systems including a wide angle-of-view have risen in compact digital cameras. Whereas, miniaturization of the pixel-pitch has progressed, and there are demands for the optical system to have a high resolution. Mainly in imaging lens systems for compact cameras, a slim camera design is often achieved by employing a retractable (telescoping) mechanism which reduces the air-distance between each lens group at the fully-retracted position (accommodated state). In the imaging lens systems which are suitable for such retractable mechanisms, in addition to the need for the thickness of each lens group to be smaller (thinner), at the design stage, it is necessary to consider the structural restrictions on the overall length of the optical system as well as on the frontmost lens diameter which is to be smaller.

Zoom lens systems for high zoom-ratio compact cameras are known in the art, e.g., Japanese Unexamined Patent Publication Nos. 2006-23529 and 2006-308957, in which the number of lens elements is relatively few, and miniaturization is achieved.

However, in the zoom lens system of Japanese Unexamined Patent Publication No. 2006-23529, the zoom ratio is approximately 5:1, and the angle-of-view at the short focal length extremity is 61 degrees; hence, a sufficient wide angle-of-view and a high zoom ratio are not achieved.

In the zoom lens system disclosed in Japanese Unexamined Patent Publication No. 2006-308957, a wide angle-of-view of approximately 78 degrees is achieved; however, the zoom ratio is approximately 4:1 through 7:1, which is unsatisfactory.

The zoom lens system disclosed in Japanese Unexamined Patent Publication No. 2008-112013 achieves a relatively compact zoom lens system having a wide angle-of-view and a high zoom ratio; however, large amounts of astigmatism and chromatic aberration occur, which is unsatisfactory for a zoom lens system that is required to attain high pixelization.

SUMMARY OF THE INVENTION

The present invention provides a zoom lens system which is ideal for use in a retractable (telescoping) lens of a camera. More specifically, the zoom lens system has a zoom ratio of approximately 10:1, has an angle-of-view of 70 degrees or more at the short focal length extremity, the diameter of the frontmost lens element is smaller, and the overall length of the zoom lens system at the short focal length extremity is shorter.

According to an aspect of the present invention, there is provided a zoom lens system including a first lens group having a positive refractive power (hereinafter, a positive first lens group), a second lens group having a negative refractive power (hereinafter, a negative second lens group), a third lens group having a positive refractive power (hereinafter, a positive third lens group), and a fourth lens group having a positive refractive power (hereinafter, a positive fourth lens group), in this order from the object.

Upon zooming from the short focal length extremity to the long focal length extremity, all of the first through fourth lens groups move along the optical axis.

The zoom lens system satisfies the following condition:

$$3 < T1/|F2| < 4 \tag{1}$$

wherein

T1 designates the traveling distance of the positive first lens group upon zooming from the short focal length extremity to the long focal length extremity; and F2 designates the focal length of the negative second lens group.

At least the negative second lens group preferably moves toward the image while following a convex-shaped curved path facing toward the image, and the positive fourth lens group first moves toward the object and thereafter moves toward the image.

The positive fourth lens group which is arranged to move upon both zooming and focusing is preferably composed of a positive lens element provided with at least one aspherical surface, and a negative lens element provided with at least one aspherical surface, in this order from the object. The positive fourth lens group preferably satisfies the following condition (2):

$$\nu a - \nu b > 25 \tag{2}$$

wherein $\nu a$ designates the Abbe number, with respect to the d-line, of the positive lens element of the positive fourth lens group; and $\nu b$ designates the Abbe number, with respect to the d-line, of the negative lens element of the positive fourth lens group.

Furthermore, the zoom lens system preferably satisfies the following conditions:

$$-7 < F1/F2 < -5 \tag{3}$$

$$-0.72 < F2/F3 < -0.50 \tag{4}$$

wherein

F1 designates the focal length of the positive first lens group;

F2 designates the focal length of the negative second lens group; and

F3 designates the focal length of the positive third lens group.

The negative second lens group can be composed of a negative lens element provided with at least one aspherical surface, a negative lens element, and a positive lens element, in this order from the object.

The negative second lens group preferably satisfies the following condition:

$$\nu c < 23 \tag{5}$$

wherein $\nu c$ designates the Abbe number, with respect to the d-line, of the positive lens element provided in the negative second lens group.

The positive first lens group can be composed of a negative lens element and at least one positive lens element, in this order from the object.

The positive first lens group preferably satisfies the following condition:

$$\nu d < 23 \tag{6}$$

wherein $\nu d$ designates the Abbe number, with respect to the d line, of the most object-side negative lens element in the positive first lens group.

The positive third lens group can be composed of a positive lens element provided with at least one aspherical surface, a cemented lens having a positive lens element and a negative lens element in this order from the object, and a negative lens element, in this order from the object.

The positive third lens group preferably satisfies the following condition:

$$Na>1.85 \tag{7}$$

wherein

Na designates the average value of the refractive index, with respect to the d-line, of the two negative lens elements in the positive third lens group.

The present disclosure relates to subject matter contained in Japanese Patent Application No. 2009-154569 (filed on Jun. 30, 2009) which is expressly incorporated herein in its entirety.

BRIEF DESCRIPTION OF THE DRAWINGS

The present invention will be discussed below in detail with reference to the accompanying drawings, in which.

DESCRIPTION OF THE PREFERRED EMBODIMENTS

Figure 31:
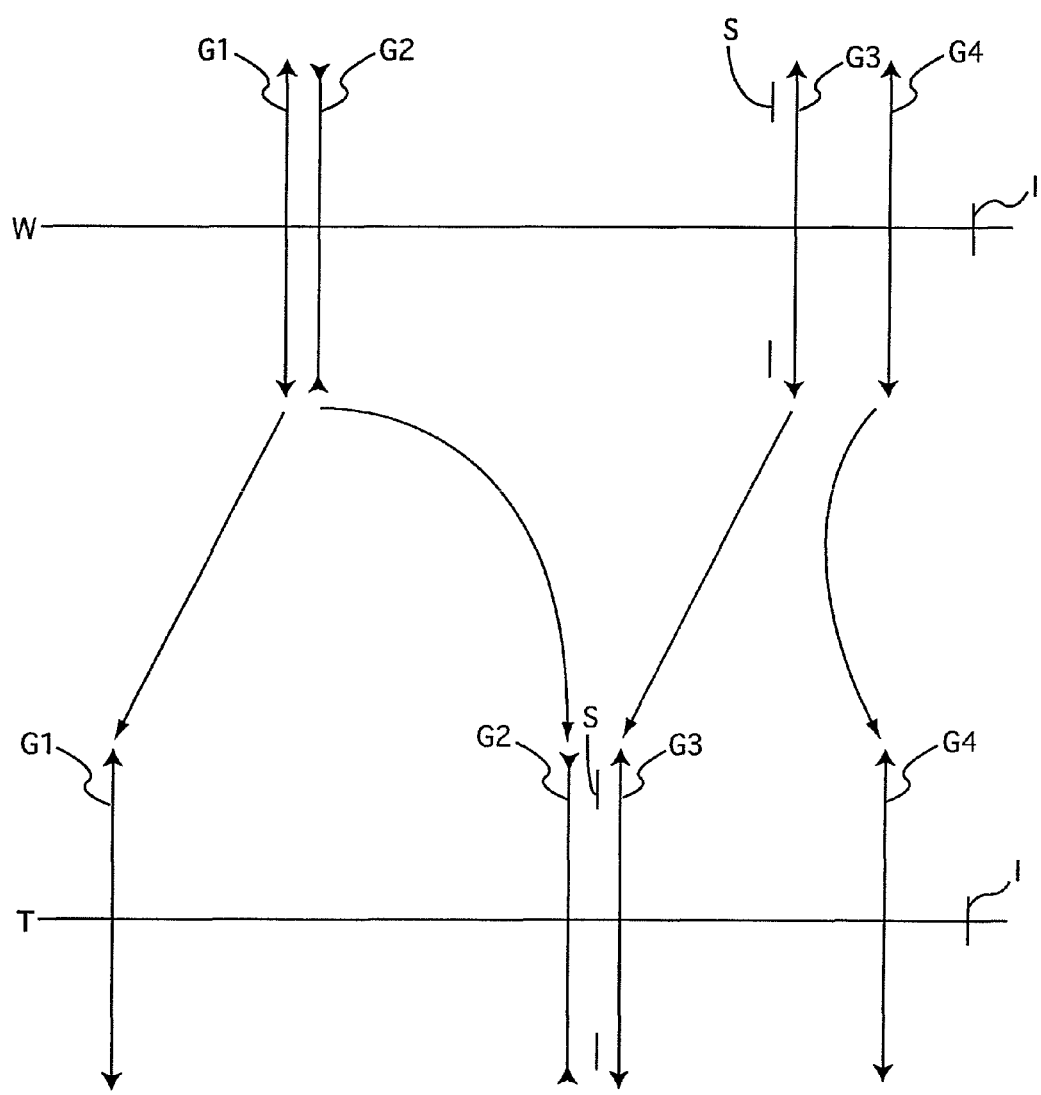
FIG. 31 shows a schematic lens-group moving paths of the zoom lens system according to the present invention.

The zoom lens system according to the present invention includes a positive first lens group G1, a negative second lens group G2, a positive third lens group G3, and a positive fourth lens group G4, in this order from the object, as shown in the zoom path diagram of FIG. 31.

A diaphragm S is provided between the negative second lens group G2 and the positive third lens group G3, and moves integrally with the positive third lens group G3.

Focusing is carried out by the positive fourth lens group G4. "I" designates the imaging plane.

Upon zooming from the short focal length extremity (W) to the long focal length extremity (T), all the lens groups G1 to G4 move in the optical axis direction; and, the distance between the positive first lens group G1 and the negative second lens group G2 increases, the distance between the negative second lens group G2 and the positive third lens group G3 decreases, and the distance between the positive third lens group G3 and the positive fourth lens group G4 increases.

More specifically, upon zooming from the short focal length extremity (W) to the long focal length extremity (T), the positive first lens group G1 monotonically moves toward the object, the negative second lens group G2 moves toward the image while following a convex-shaped curved path facing toward the image, the positive third lens group G3 monotonically moves toward the object, and the positive fourth lens group G4 first moves toward the object and thereafter moves toward the image.

The positive first lens group G1, as shown in the first, fourth and fifth embodiments, is composed of a negative lens element 10, a positive lens element 11, and a positive lens element 12, in this order from the object.

More specifically, the negative lens element 10 is a negative meniscus lens element having the convex surface facing toward the object, the positive lens element 11 is a positive meniscus lens element having the convex surface facing toward the object, and the positive lens element 12 is a positive meniscus lens element having the convex surface facing toward the object side or is a biconvex positive lens element.

Alternatively, the positive first lens group G1, as shown in the second and third embodiments, can be composed of a negative meniscus lens element 10 having the convex surface facing toward the object, and a planoconvex positive lens element 11 having the convex surface facing toward the object, in this order from the object.

The negative second lens group G2, as shown the first through fifth embodiments, is composed of a negative lens element 20, a negative lens element 21 and a positive lens element 22, in this order from the object.

More specifically, the negative lens element 20 is a negative meniscus lens element having the convex surface facing toward the object or a biconcave negative lens element, the negative lens element 21 is a biconcave negative lens element, and the positive lens element 22 is a positive meniscus lens element having the convex surface facing toward the object or a biconvex positive lens element.

The negative lens element 20 can have an aspherical surface on both sides thereof, as shown in the second and third embodiments.

The positive third lens group G3, as shown in the first embodiment, is composed of a biconvex positive lens element 30, a cemented lens 33 having a positive meniscus lens element 31 having the convex surface facing toward the object and a negative meniscus lens element 32 having the convex surface facing toward the object, in this order from the object.

The biconvex positive lens element 30 has an aspherical surface on both sides thereof.

The positive third lens group G3, as shown in the second through fifth embodiments, can be composed of a biconvex positive lens element 30, a cemented lens 33 having a biconvex positive lens element 31 and a negative meniscus lens element 32 having the convex surface facing toward the image, and a negative meniscus lens element 34 having the convex surface facing toward the object, in this order from the object.

Similar to the first embodiment, the biconvex positive lens element 30 also has an aspherical surface on both sides thereof in the second through fifth embodiments.

The positive fourth lens group G4, as shown in the first through fifth embodiments, is composed of a positive lens element 40 and a negative lens element 41, in this order from the object.

More specifically, the positive lens element 40 is a biconvex positive lens element and has an aspherical surface on both sides thereof. The negative lens element 41 can be one of a negative meniscus lens element having the convex surface facing toward the image, a planoconcave negative lens element having the concave surface facing toward the object and a biconcave negative lens element.

The object-side surface of the negative lens element 41 is an aspherical surface.

In order to miniaturize a camera to which retractable zoom lens system using multi-stage barrels is installed, it is important to reduce the diameter of the first lens group (i.e., the most object-side lens group) and to reduce the overall length of the zoom lens system. In addition, each lens group is required to have a smaller thickness (length).

Furthermore, it is also necessary to simplify the mechanical structure for moving each lens group upon zooming. If the number of lens groups used for zooming is reduced, the mechanical structure therefor can be simplified; however, it is difficult to achieve a high zoom ratio with such an arrangement. Generally, reducing the number of lens elements in order to miniaturize the zoom lens system and reducing the thickness (length) of each lens group increase the degree of difficulty in correcting aberrations. In order to suitably correct various aberrations over the entire zooming range while achieving miniaturization of the zoom lens system, an appropriate refractive-power distribution for each lens group and an appropriate lens arrangement are necessary.

The zoom lens system of the present invention is a positive-lead type zoom lens system composed of a positive lens group, a negative lens group, a positive lens group and a positive lens group, in this order from the object, which has the advantage of being able to achieve a higher zoom ratio than in a negative-lead type zoom lens system, that is often used in a compact camera.

However, in a positive-lead type zoom lens system, the diameter of the frontmost lens group (i.e., the most object-side lens group) easily becomes larger, so that if attempts are made to achieve a wider angle-of-view, the frontmost lens diameter increases even more. Moreover, in the case where multi-stage barrels are utilized to advance and retract the zoom lens system, there is the typical problem of the diameters of the multi-stage barrels, i.e., when the zoom lens system is retracted, the diameter of the multi-stage barrels increases to the extent of being unsuitable for use in a compact camera.

In the present invention, in order to solve such problems, the degree of freedom in movement of the negative second lens group and the positive third lens group is increased by moving the positive first lens group by a longer distance upon zooming from the short focal length extremity to the long focal length extremity. Due to this arrangement, each lens group can suitably contributes to the zooming operation of the zoom lens system. If, for example, the positive first lens group were to remain stationary upon zooming, the burden of zooming on the negative second lens group would increase, resulting in the diameter of the positive first lens group easily becoming larger.

Condition (1) specifies the ratio of the traveling distance of the positive first lens group G1 to the focal length of the negative second lens group G2 upon zooming between the short focal length extremity and the long focal length extremity. By satisfying condition (1), a wide-angle and high zoom-ratio zoom lens system suitable for telescoping (advancing and retracting), in the optical axis direction, can be achieved.

If T1/|F2| exceeds the lower limit of condition (1), the traveling distance of the positive first lens group G1 upon zooming becomes shorter. Consequently, degree of freedom with respect to the traveling distance of the negative second lens group G2 and that of the positive third lens group G3 is reduced. However, in order to increase the zoom ratio, it becomes necessary to move the negative second lens group G2 by a longer distance in the optical axis direction. If attempts are made to achieve a wider angle-of-view while the traveling distance of the negative second lens group G2 is maintained shorter, the diameter of the positive first lens group G1 becomes undesirably larger. On the other hand, if the diameter of the positive first lens group G1 is intentionally made smaller, the refractive power of each lens group has to be made stronger, which makes it difficult to correct aberrations over the entire zooming range, and such a zoom lens system will have difficulty in attaining a higher resolution.

If T1/|F2| exceeds the upper limit of condition (1), the traveling distance of the positive first lens group G1 upon zooming becomes longer, so that the overall length of the zoom lens system at the long focal length extremity becomes undesirably large. In order to reduce the overall length of the zoom lens system at the long focal length extremity, it becomes necessary to shorten the overall length of the zoom lens system at the short focal length extremity; however, if a wide angle-of-view is achieved with the overall length of the zoom lens system being maintained shorter at the short focal length extremity, the correcting of off-axis aberrations becomes difficult.

The positive fourth lens group G4 is moved in an optical axis direction upon both zooming and focusing. As shown in each embodiment, the positive fourth lens group G4 is preferably composed of a positive lens element having at least one aspherical surface, and a negative lens element having at least one aspherical surface, in this order from the object.

Condition (2) specifies the difference in the Abbe numbers between the positive lens element and the negative lens element which constitute the positive fourth lens group G4.

If νa−νb exceeds the lower limit of condition (2), the thicknesses of the positive and negative lens elements of the positive fourth lens group G4 increase in order to correct lateral chromatic aberration, which in turn increases the overall thickness of the fourth lens group G4. Consequently, miniaturization of the zoom lens system at the fully-retracted (accommodated) position becomes difficult. If attempts are made to reduce the overall thickness of the positive fourth lens group G4, fluctuations of lateral chromatic aberration become larger when focusing on an object at infinity through to an object at a close distance.

Condition (3) specifies the ratio of the focal length of the positive first lens group G1 to the focal length of the negative second lens group G2 in order to prevent both an enlarged diameter of the positive first lens group G1 at the short focal length extremity and an increase in the overall length of the zoom lens system at the long focal length extremity.

If F1/F2 exceeds the lower limit of condition (3), the refractive power of the negative second lens group G2 becomes too strong with respect to the refractive power of the positive first lens group G1. As a result, the diameter of the positive first lens group G1 becomes too large, and the overall length of the zoom lens system at the long focal length extremity becomes too long. The reduction in the overall length of the zoom lens system can be achieved by increasing the refractive power of each lens group and by reducing the traveling distance of each lens group upon zooming; however, the correcting of aberrations over the entire zooming range becomes difficult.

If F1/F2 exceeds the upper limit of condition (3), the refractive power of the negative second lens group G2 becomes too weak with respect to the refractive power of the positive first lens group G1. As a result, it becomes difficult to achieve a wide angle-of-view of 70 degrees or more, while it is advantageous for reducing the overall length of the zoom lens system at the long focal length extremity.

Condition (4) specifies the ratio of the focal length of the negative second lens group G2 to the focal length of the positive third lens group G3 in order to appropriately distribute the refractive power over the negative second lens group G2 and the positive third lens group G3, and to achieve miniaturization of the entire zoom lens system.

If F2/F3 exceeds the lower limit of condition (4), the refractive power of the positive third lens group G3 becomes too strong with respect to the refractive power of the negative second lens group G2. When the positive third lens group G3 has a stronger refractive power, zooming can be carried out by a shorter traveling distance of the positive third lens group G3; however, it becomes difficult to correct aberrations occurred in the positive third lens group G3, and the traveling distance of the negative second lens group G2 upon zooming becomes longer. Consequently, the diameter of the positive first lens group G1 undesirably increases. Hence, it becomes necessary to reduce the traveling distance of the negative second lens group G2 in order to reduce the diameter of the positive first lens group G1, so that a higher zoom ratio cannot be achieved.

If F2/F3 exceeds the upper limit of condition (4), the refractive power of the positive third lens group G3 with respect to the refractive power of the negative second lens group G2 becomes too weak. Consequently, the negative second lens group G2 can perform zooming with a short traveling distance, so that it is advantageous to for reduce the diameter of the positive first lens group G1. However, the traveling distance of the positive third lens group G3 upon zooming becomes longer to attain a desired (predetermined) zoom ratio, so that the height of the axial marginal light rays increases at the long focal length extremity. As a result, the correcting of spherical aberration and coma becomes difficult.

It is practical for the second lens group G2, as shown in each embodiment, to be composed of a negative lens element having at least one aspherical surface, a negative lens element and a positive lens element, in this order from the object.

Condition (5) specifies the Abbe number of the positive lens element which is solely provided in the negative second lens group G2, and is for favorably correcting chromatic aberration in the negative second lens group G2.

In the embodiments, the refractive power of the negative second lens group G2 is stronger than the refractive power of each of the other lens groups. The effective diameters of the positive first lens group G1 and the negative second lens group G2 are larger than those of the remaining lens groups. Accordingly, if the positive first lens group G1 and the negative second lens group G2 are composed of a large number of lens elements, the thicknesses of these lens groups G2 and G3 increase. Therefore the positive first lens group G1 and the negative second lens group G2 are preferably composed of a smaller number of lens elements.

As shown in the embodiments, in the case where the negative second lens group G2 is composed of a negative lens element, a negative lens element, and a positive lens element, in this order from the object, it is necessary to suitably correct aberrations occurred in the negative second lens group G2 which is provided with a stronger refractive power to attain a wider angle-of-view at the short focal length extremity. Specifically, by providing at least one aspherical surface on the most object-side lens element having a stronger refractive power, distortion and astigmatism at the short focal length extremity are corrected.

Furthermore, if the Abbe number of the most image-side positive lens element satisfies condition (5), lateral chromatic aberration and axial chromatic aberration occurred in the negative second lens group G2 can be reduced as much as possible, and fluctuation of chromatic aberration upon zooming can be reduced.

The positive first lens group G1, as shown in each embodiment, is composed of a negative lens element and at least one positive lens element, in this order from the object.

Condition (6) specifies the Abbe number, with respect to the d-line, of the most object-side negative lens element in the positive first lens group G1, and is for correcting chromatic aberration occurred in the negative second lens group G2.

In a high zoom-ratio zoom lens system, residual aberrations in a first lens group at the long focal length extremity are magnified by a second to the last lens groups, which causes a large adverse influence on the imaging quality on the imaging plane. Therefore it is especially important to correct chromatic aberrations in the first lens group.

According to the embodiments, by forming the most object-side negative lens element from a glass material having an Abbe number satisfying condition (6), the correcting of aberrations can be suitably carried out over the entire zoom lens system.

The positive third lens group G3, as shown in the second through fifth embodiments, is composed of a positive lens element having at least one aspherical surface, and a cemented lens having a positive lens element and a negative lens element, and a negative lens element, in this order from the object.

Condition (7) specifies the average value of the refractive index with respect to the d-line of the two negative lens elements in the positive third lens group G3, when the third lens group G3 is composed as described above.

The height of a marginal light ray in the positive third lens group G3 is the highest out of all the other lens groups. Therefore in order to achieve a high resolution over the entire zooming range, it is necessary to suitably correct aberrations, such as spherical aberration, etc. Accordingly, in the second through fifth embodiments, the positive third lens group G3 is composed of a positive lens element having at least one aspherical, a cemented lens having a positive lens element and a negative lens element, and a negative lens element, in this order from the object.

At the most object-side of the positive third lens group G3, the positive lens element having the strongest refractive power is provided; and, by at least one aspherical surface provided on the positive lens element, occurrence of spherical aberration is reduced.

By forming the two negative lens elements from a material having an Abbe number satisfying condition (7), field curvature can be reduced, and the optical quality of the entire picture image can be improved.

If the refractive index of the two negative lens elements provided on the image side (within the positive third lens group G3) becomes too small to the extent of exceeding the lower limit of condition (7), the Petzval Sum becomes large, so that the correcting of field curvature cannot be adequately done.

[EMBODIMENTS]

Specific embodiments will be herein discussed. The following embodiments correspond to when used in a digital SLR camera.

In the diagrams of chromatic aberration (axial chromatic aberration) represented by spherical aberration, the solid line and the two types of dotted lines respectively indicate spherical aberrations with respect to the d, g and C lines.

In the diagrams of lateral chromatic aberration, Y designates the image height, the two types of dotted lines respectively indicate magnification with respect to the g and C lines; however, the d line as the base line coincides with the ordinate.

In the diagrams of astigmatism, Y designates the image height, S designates the sagittal image, and M designates the meridional image.

In the diagrams of distortion, Y designates the image height.

In the tables, R designates the radius of curvature, d designates the lens-element thickness or a distance between lens elements (lens groups), Nd designates the refractive index of the d-line, and vd designates the Abbe number with respect to the d line, FNO. designates the F-number, f designates the focal length of the entire lens system, W designates the half angle-of-view (°), Y designates the image height, fB designates the back focal distance (the distance between the image-side surface of the most image-side cover glass to the imaging plane), L designates the length of the lens system (the distance from surface No. 1 to the imaging plane).

FNO., f, W, Y, fB, L and d (which changes according to focusing) are shown in the following order: "the short focal length extremity, an intermediate focal length, the long focal length extremity".

In addition to the above, an aspherical surface which is symmetrical with respect to the optical axis is defined as follows:

$$x = cy^2/(1 + [1 - \{1+K\}c^2y^2]^{1/2}) + A4y^4 + A6y^6 + A8y^8 + A10y^{10} \ldots$$

wherein:
c designates a curvature of the aspherical vertex (1/r);
y designates a distance from the optical axis;
K designates the conic coefficient; and
A4 designates a fourth-order aspherical coefficient;
A6 designates a sixth-order aspherical coefficient;
A8 designates a eighth-order aspherical coefficient; and
A10 designates a tenth-order aspherical coefficient.

[Embodiment 1]

Figure 1:
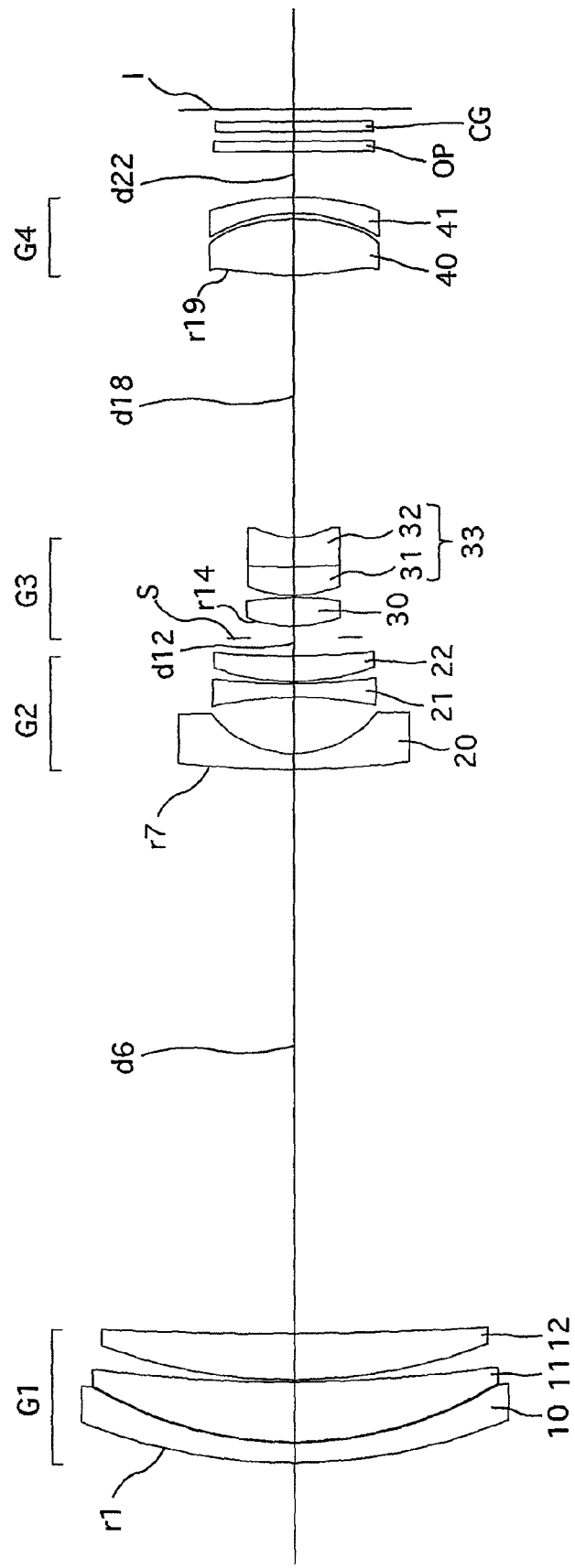
FIG. 1 shows a lens arrangement of a zoom lens system, according to a first embodiment of the present invention, at the long focal length extremity, when an object at infinity is in an in-focus state.
Figure 2:
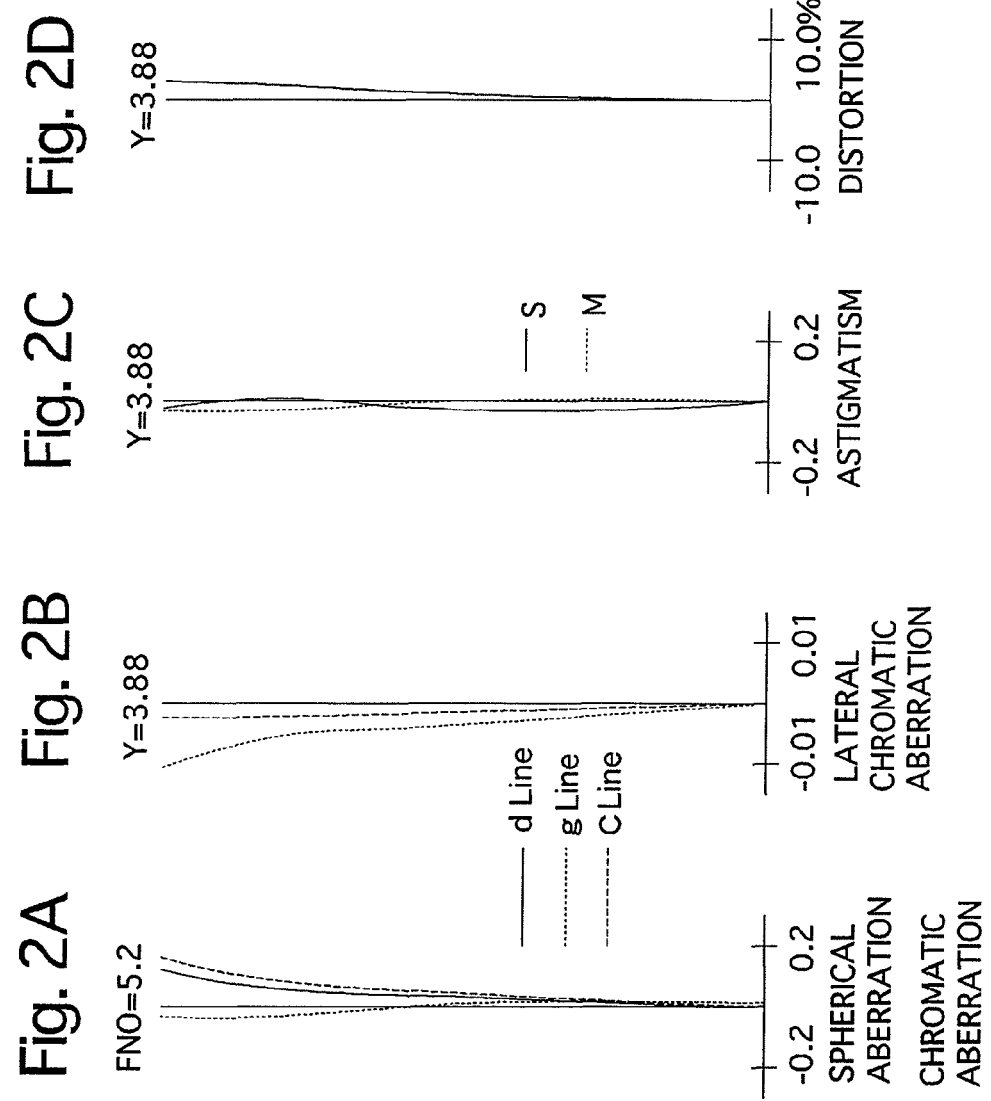
FIGS. 2A, 2B, 2C and 2D show aberrations occurred in the lens arrangement shown in FIG. 1.

FIG. 1 shows the lens arrangement of a zoom lens system, according to a first embodiment of the present invention, at the long focal length extremity, when an object at infinity is in an in-focus state. FIGS. 2A through 2D show aberrations occurred in the lens arrangement shown in FIG. 1.

Figure 3:
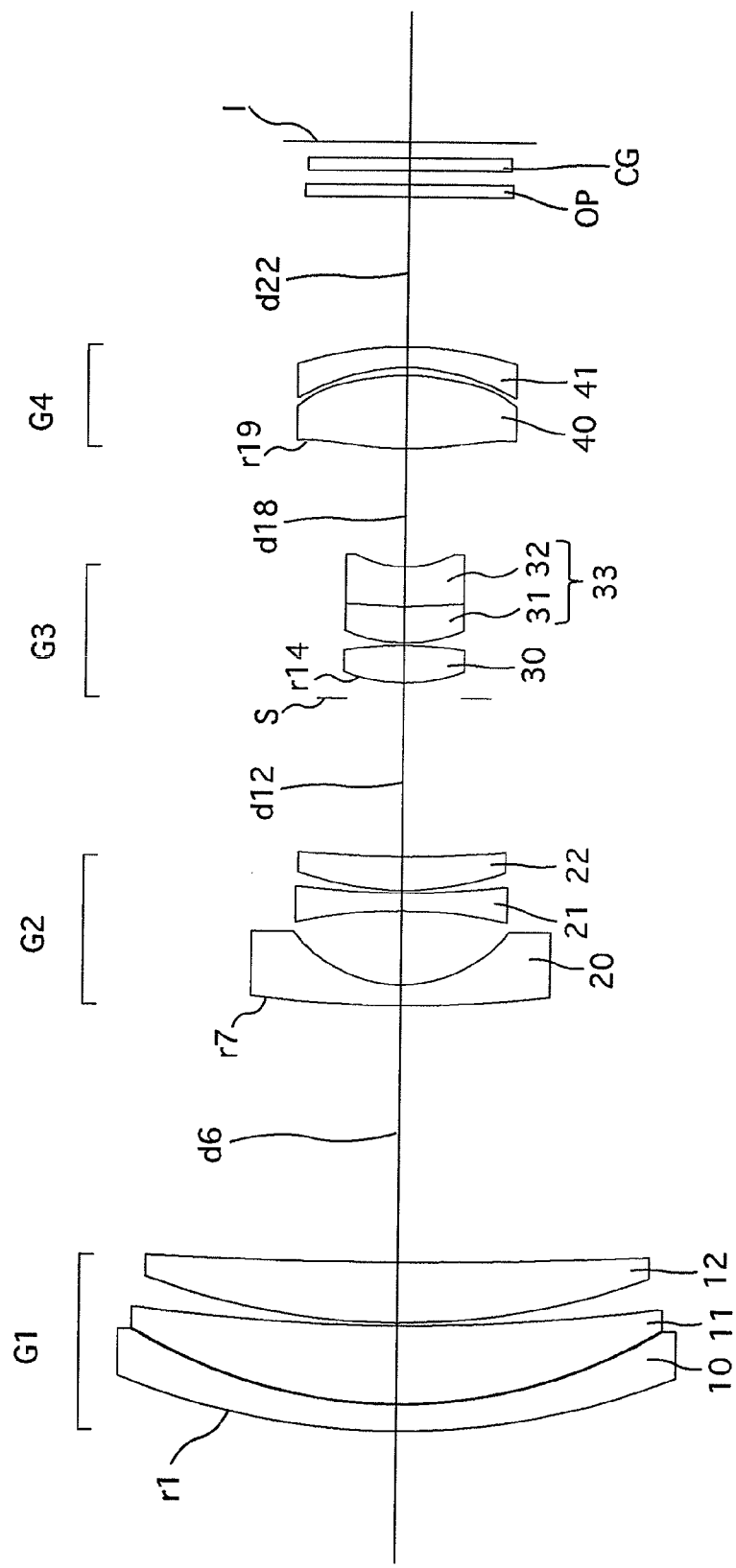
FIG. 3 shows a lens arrangement of the zoom lens system, according to the first embodiment of the present invention, at an intermediate focal length position, when an object at infinity is in an in-focus state.
Figure 4:
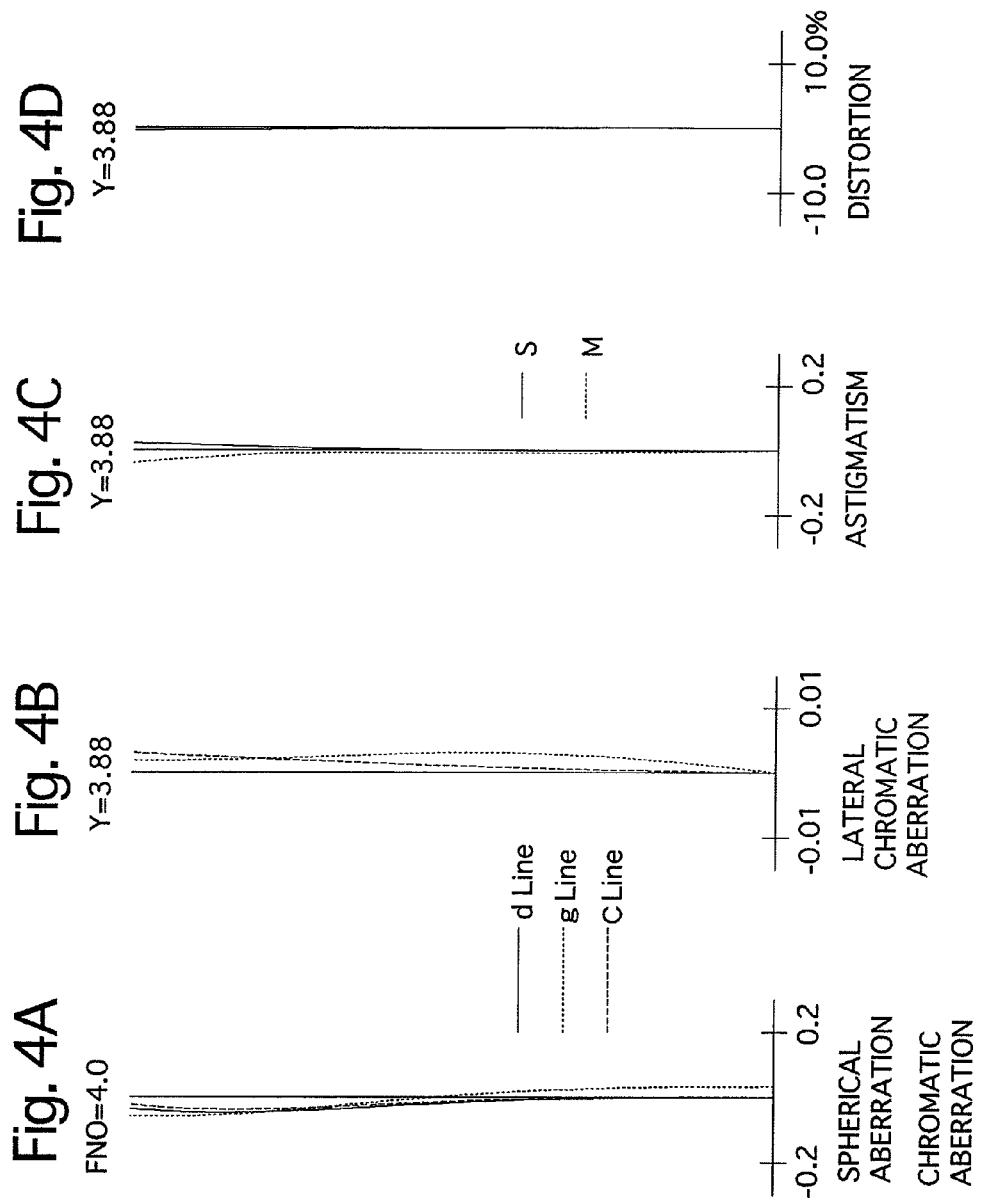
FIGS. 4A, 4B, 4C and 4D show aberrations occurred in the lens arrangement shown in FIG. 3.

FIG. 3 shows the lens arrangement of the zoom lens system, according to a first embodiment of the present invention, at an intermediate focal length position, when an object at infinity is in an in-focus state. FIGS. 4A through 4D show aberrations occurred in the lens arrangement shown in FIG. 3.

Figure 5:
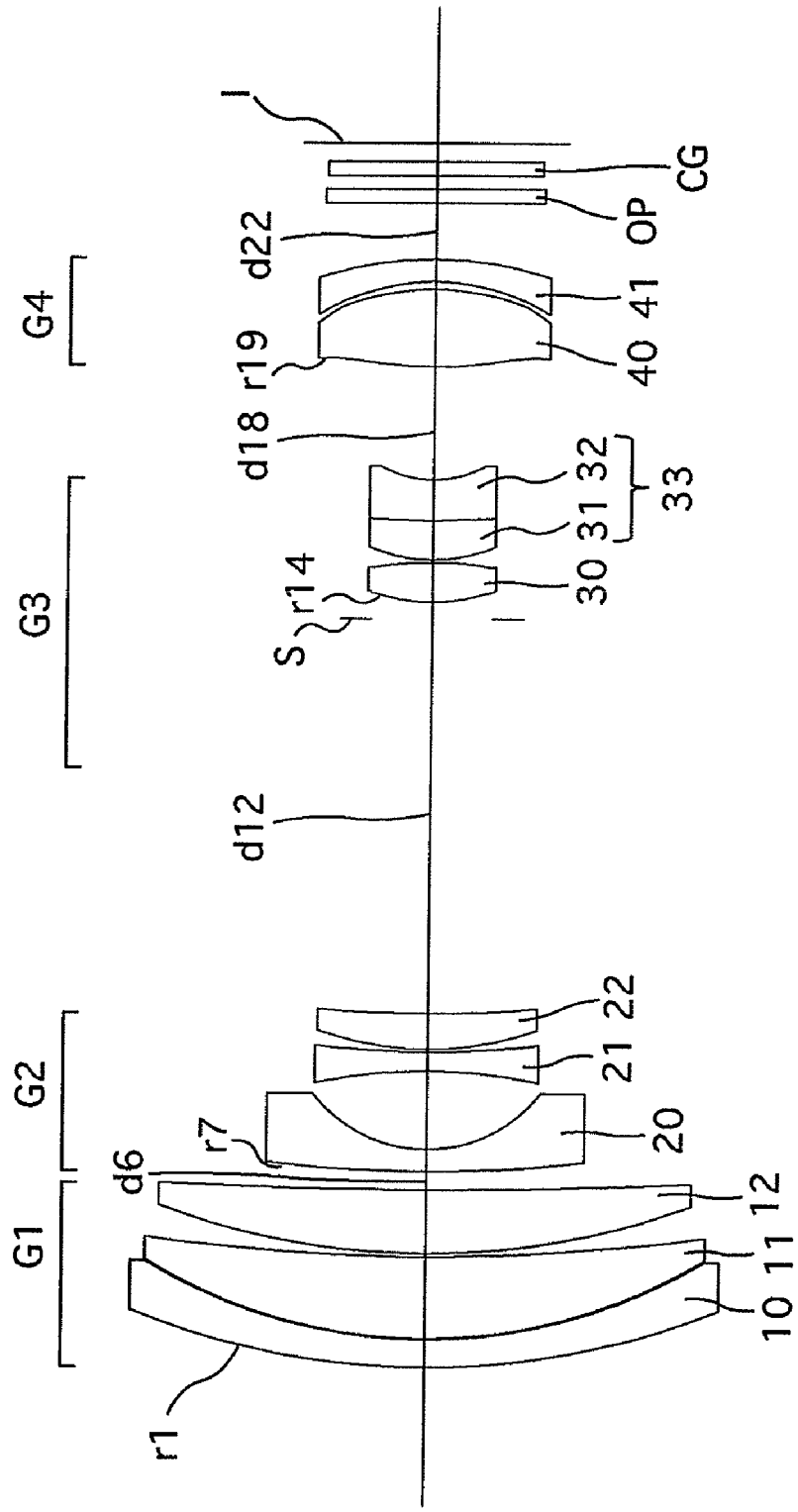
FIG. 5 shows a lens arrangement of the zoom lens system, according to the first embodiment of the present invention, at the short focal length extremity, when an object at infinity is in an in-focus state.
Figure 6:
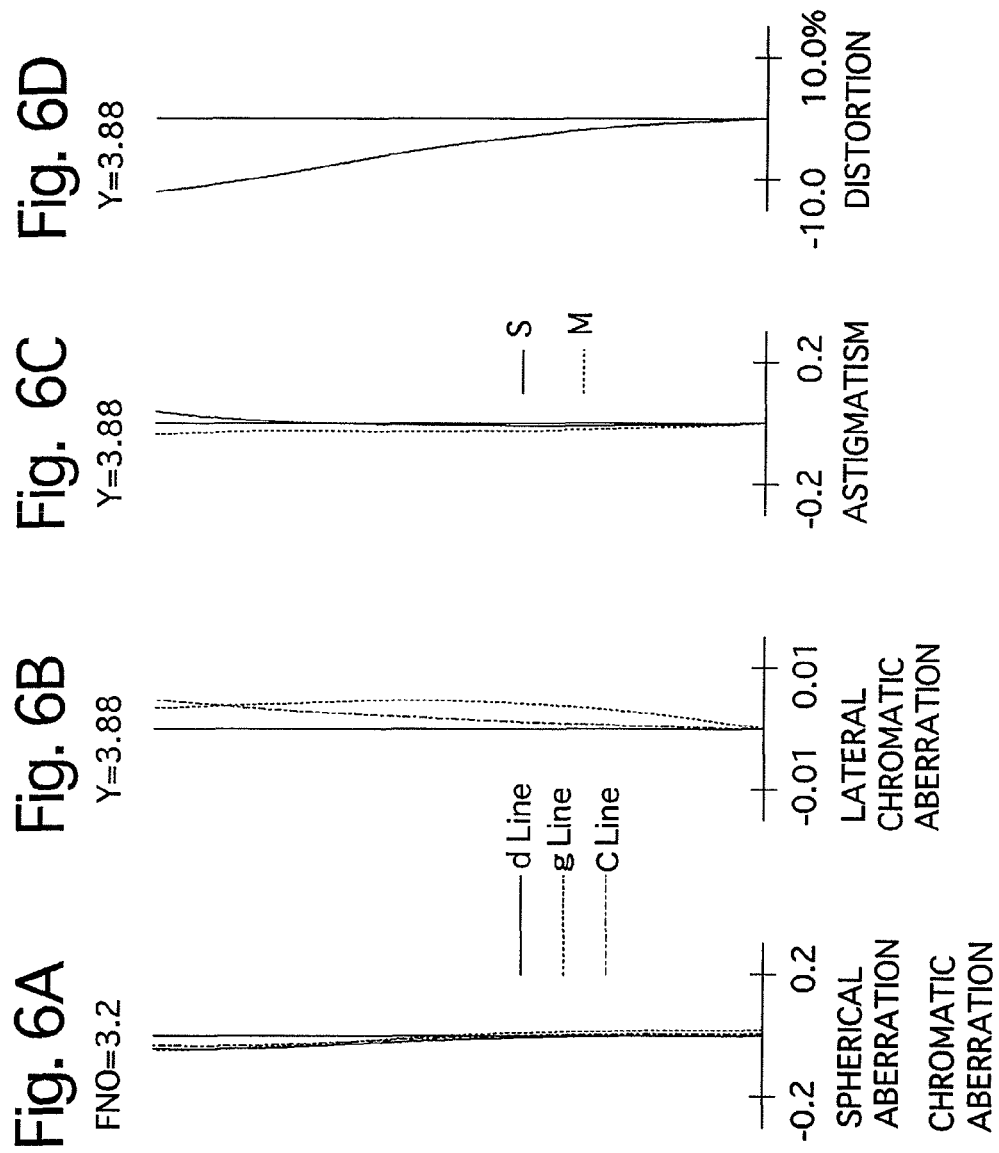
FIGS. 6A, 6B, 6C and 6D show aberrations occurred in the lens arrangement shown in FIG. 5.

FIG. 5 shows the lens arrangement of the zoom lens system, according to the first embodiment of the present invention, at the short focal length extremity, when an object at infinity is in an in-focus state. FIGS. 6A through 6D aberrations occurred in the lens arrangement shown in FIG. 5.

Table 1 shows the lens surface data, Table 2 shows the aspherical surface data, Table 3 shows various zoom lens system data, and Table 4 shows the zoom lens group data of the first numerical embodiment.

The zoom lens system of the first embodiment is composed of a positive first lens group G1, a negative second lens group G2, a positive third lens group G3, and a positive fourth lens group G4, in this order from the object.

The positive first lens group G1 (surface Nos. 1 through 6) is composed of a negative meniscus lens element 10 having the convex surface facing toward the object, a positive meniscus lens element 11 having the convex surface facing toward the object, and a positive meniscus lens element 12 having the convex surface facing toward the object, in this order from the object.

The negative second lens group G2 (surface Nos. 7 through 12) is composed of a negative meniscus lens element 20 having the convex surface facing toward the object, a biconcave negative lens element 21, and a positive meniscus lens element 22 having the convex surface facing toward the object.

A diaphragm S (surface No. 13) is provided between the negative second lens group G2 and the positive third lens group G3, and moves integrally with the positive third lens group G3.

The positive third lens group G3 (surface Nos. 14 through 18) is composed of a biconvex positive lens element 30, and a cemented lens having a positive meniscus lens element 31 having the convex surface facing toward the object and a negative meniscus lens element 32 having the convex surface facing toward the object, in this order from the object. The biconvex positive lens element 30 has an aspherical surface on both sides thereof.

The positive fourth lens group G4 (surface Nos. 19 through 22) is composed of a biconvex lens element 40, and a negative meniscus lens element 41 having the convex surface facing toward the image, in this order from the object.

The biconvex lens element 40 has an aspherical surface on both sides thereof. The negative meniscus lens element 41 has an aspherical surface on the object side thereof. An optical filter OP (surface Nos. 23 and 24) and a cover glass CG (surface Nos. 25 and 26) are provided behind the positive fourth lens group G4 (lens element 41) (i.e., between the fourth lens group G4 and the imaging plane I).

TABLE 1

LENS SURFACE DATA

| Surf. No. | R | d | Nd | vd |
|---|---|---|---|---|
| 1 | 29.308 | 1.000 | 1.90366 | 31.3 |
| 2 | 20.032 | 0.030 | | |
| 3 | 19.903 | 2.977 | 1.49700 | 81.6 |
| 4 | 75.677 | 0.100 | | |
| 5 | 28.067 | 2.303 | 1.59240 | 68.3 |
| 6 | 183.534 | d6 | | |
| 7 | 48.537 | 0.800 | 1.88300 | 40.8 |
| 8 | 5.330 | 2.846 | | |
| 9 | −19.672 | 0.700 | 1.75500 | 52.3 |
| 10 | 35.396 | 0.100 | | |
| 11 | 11.995 | 1.300 | 1.94594 | 18.0 |
| 12 | 49.993 | d12 | | |
| 13(Diaphragm) | ∞ | 0.600 | | |

TABLE 1-continued

LENS SURFACE DATA

| Surf. No. | R | d | Nd | vd |
|---|---|---|---|---|
| 14* | 6.362 | 1.450 | 1.59240 | 68.3 |
| 15* | −13.472 | 0.100 | | |
| 16 | 5.910 | 1.433 | 1.49700 | 81.6 |
| 17 | 28.023 | 1.500 | 1.90366 | 31.3 |
| 18 | 3.955 | d18 | | |
| 19* | 15.694 | 2.829 | 1.54358 | 55.7 |
| 20* | −8.086 | 0.300 | | |
| 21* | −6.627 | 0.800 | 1.60641 | 27.2 |
| 22 | −13.732 | d22 | | |
| 23 | ∞ | 0.500 | 1.51633 | 64.1 |
| 24 | ∞ | 0.510 | | |
| 25 | ∞ | 0.500 | 1.51633 | 64.1 |
| 26 | ∞ | — | | |

The symbol * designates the aspherical surface which is rotationally symmetrical with respect to the optical axis.

TABLE 2

ASPHERICAL SURFACE DATA
The aspherical surface coefficients not indicated are zero (0.00):

| Surf. No. | K | A4 | A6 | A8 | A10 |
|---|---|---|---|---|---|
| 14 | −1.000 | −0.1826 × 10$^{-3}$ | 0.3035 × 10$^{-4}$ | −0.2990 × 10$^{-5}$ | |
| 15 | 0.000 | 0.1687 × 10$^{-3}$ | 0.2860 × 10$^{-4}$ | −0.2956 × 10$^{-5}$ | |
| 19 | 0.000 | 0.1893 × 10$^{-3}$ | −0.5372 × 10$^{-4}$ | −0.5156 × 10$^{-6}$ | |
| 20 | 0.000 | 0.2738 × 10$^{-2}$ | −0.1980 × 10$^{-3}$ | 0.9174 × 10$^{-6}$ | 0.8292 × 10$^{-7}$ |
| 21 | 0.000 | 0.2776 × 10$^{-2}$ | −0.1707 × 10$^{-3}$ | 0.4022 × 10$^{-5}$ | |

TABLE 3

ZOOM LENS SYSTEM DATA
Zoom Ratio 11.70

Short Focal Length Extremity

| | |
|---|---|
| FNO. | 3.2 |
| f | 5.00 |
| W | 41.4 |
| Y | 3.88 |
| fB | 0.59 |
| L | 44.57 |
| d6 | 0.671 |
| d12 | 14.428 |
| d18 | 4.136 |
| d22 | 2.063 |

Intermediate Focal Length

| | |
|---|---|
| FNO. | 4.0 |
| f | 11.90 |
| W | 18.1 |
| Y | 3.88 |
| fB | 0.59 |
| L | 49.57 |
| d6 | 9.839 |
| d12 | 6.111 |
| d18 | 4.581 |
| d22 | 5.771 |

Long Focal Length Extremity

| | |
|---|---|
| FNO. | 5.2 |
| f | 58.50 |
| W | 3.7 |
| Y | 3.88 |
| fB | 0.59 |
| L | 68.00 |
| d6 | 28.294 |
| d12 | 0.900 |
| d18 | 13.237 |
| d22 | 2.300 |

TABLE 4

| ZOOM LENS GROUP DATA | | |
|---|---|---|
| Lens Group | First Surface | Focal Length |
| 1 | 1 | 45.41 |
| 2 | 7 | −7.00 |
| 3 | 14 | 10.14 |
| 4 | 19 | 18.41 |

[Embodiment 2]

Figure 7:
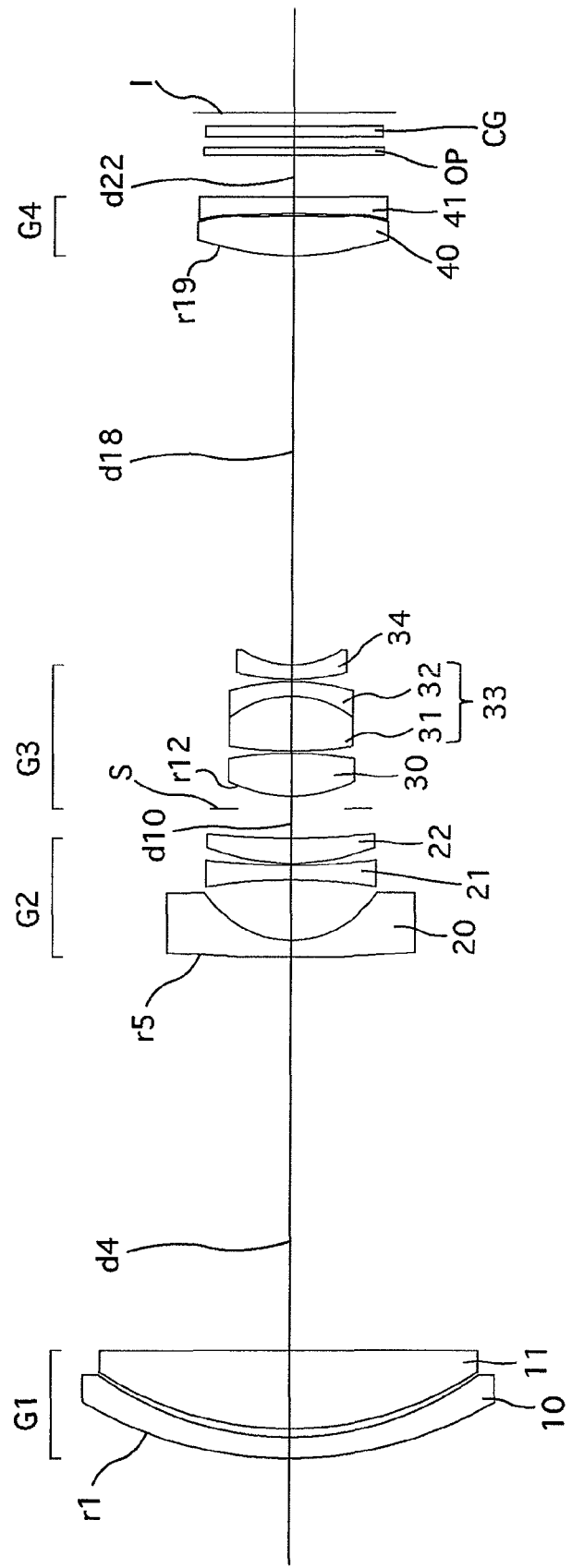
FIG. 7 shows a lens arrangement of the zoom lens system, according to a second embodiment of the present invention, at the long focal length extremity, when an object at infinity is in an in-focus state.
Figure 8:
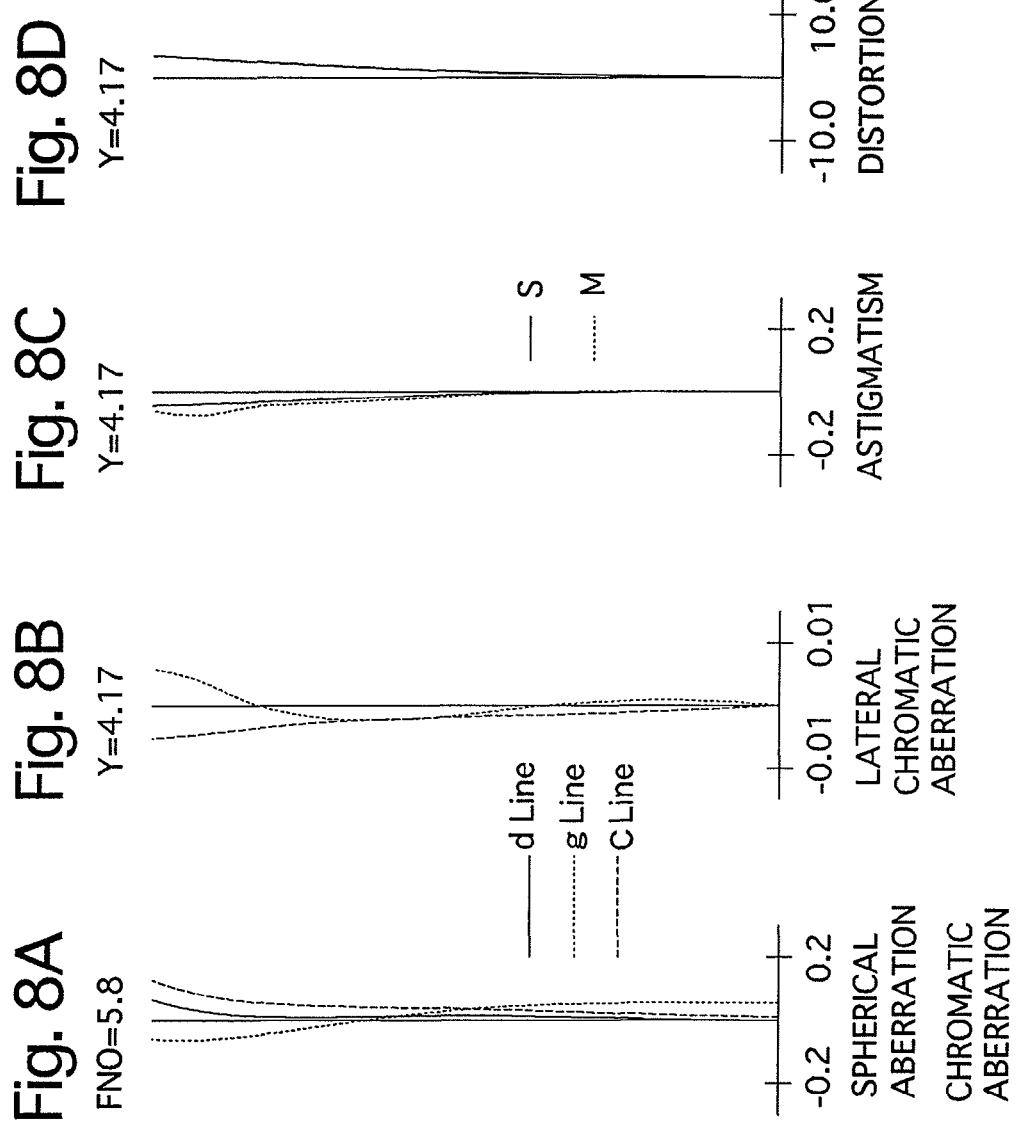
FIGS. 8A, 8B, 8C and 8D show aberrations occurred in the lens arrangement shown in FIG. 7.

FIG. 7 shows the lens arrangement of the zoom lens system, according to a second embodiment of the present invention, at the long focal length extremity, when an object at infinity is in an in-focus state. FIGS. 8A through 8D show aberrations occurred in the lens arrangement shown in FIG. 7.

Figure 9:
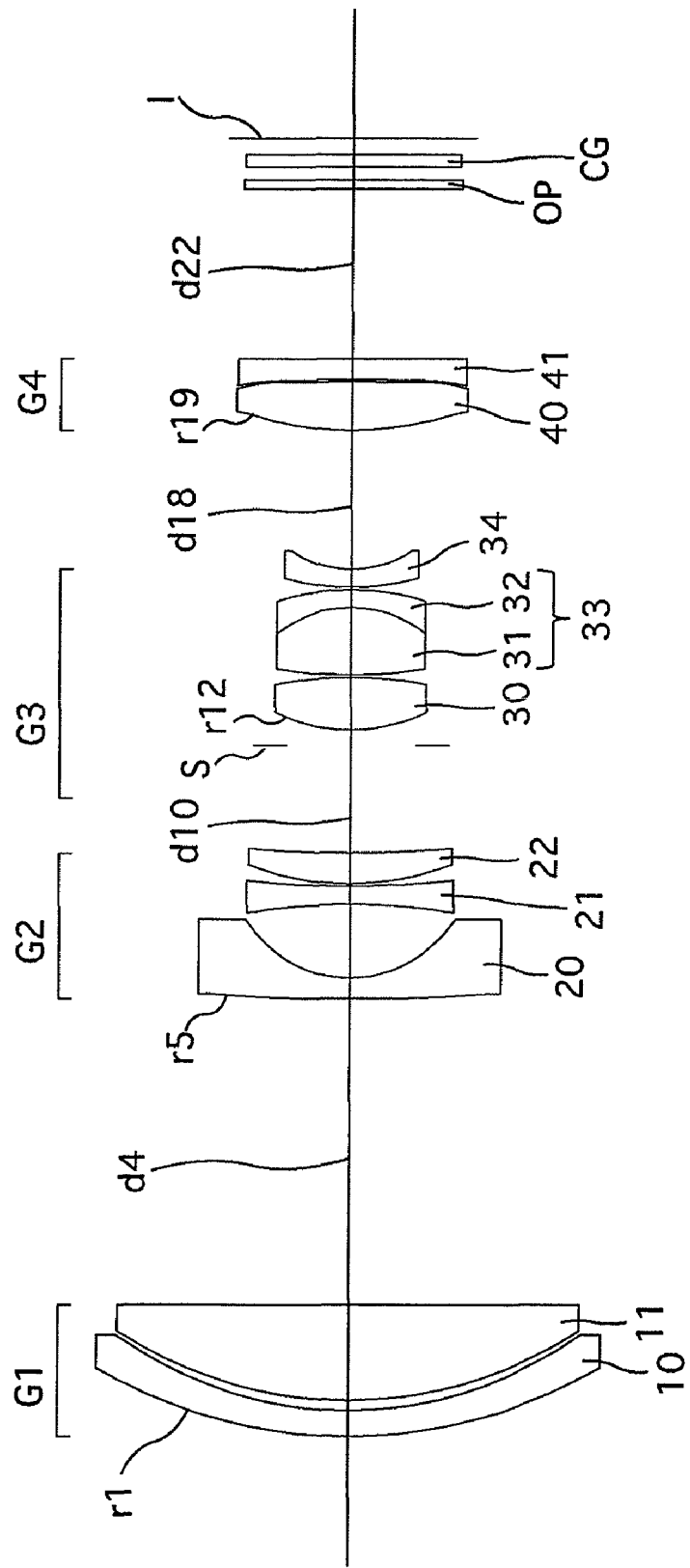
FIG. 9 shows a lens arrangement of the zoom lens system, according to the second embodiment of the present invention, at an intermediate focal length position, when an object at infinity is in an in-focus state.
Figure 10:
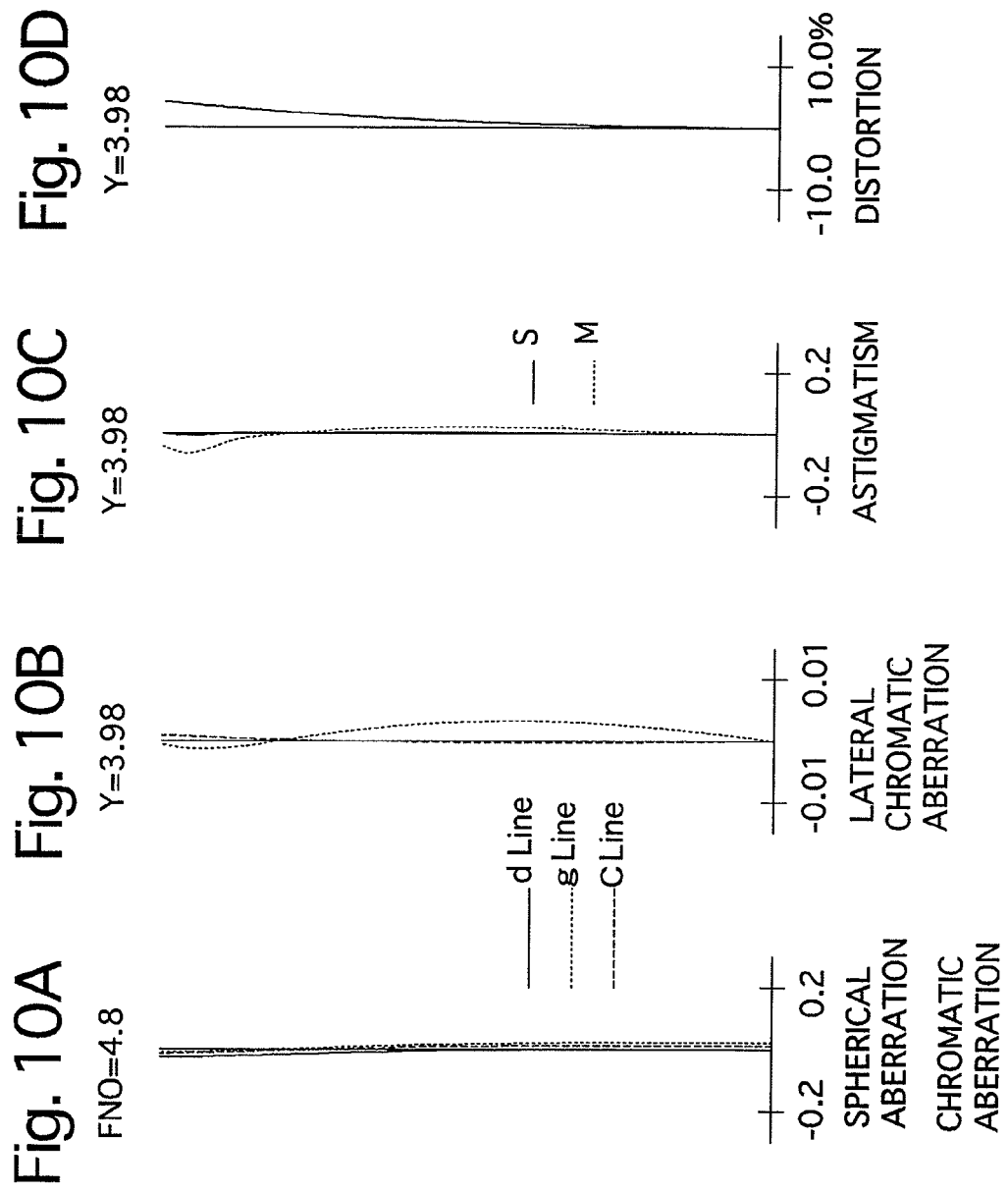
FIGS. 10A, 10B, 10C and 10D show aberrations occurred in the lens arrangement shown in FIG. 9.

FIG. 9 shows the lens arrangement of the zoom lens system, according to a second embodiment of the present invention, at an intermediate focal length position, when an object at infinity is in an in-focus state. FIGS. 10A through 10D show aberrations occurred in the lens arrangement shown in FIG. 9.

Figure 11:
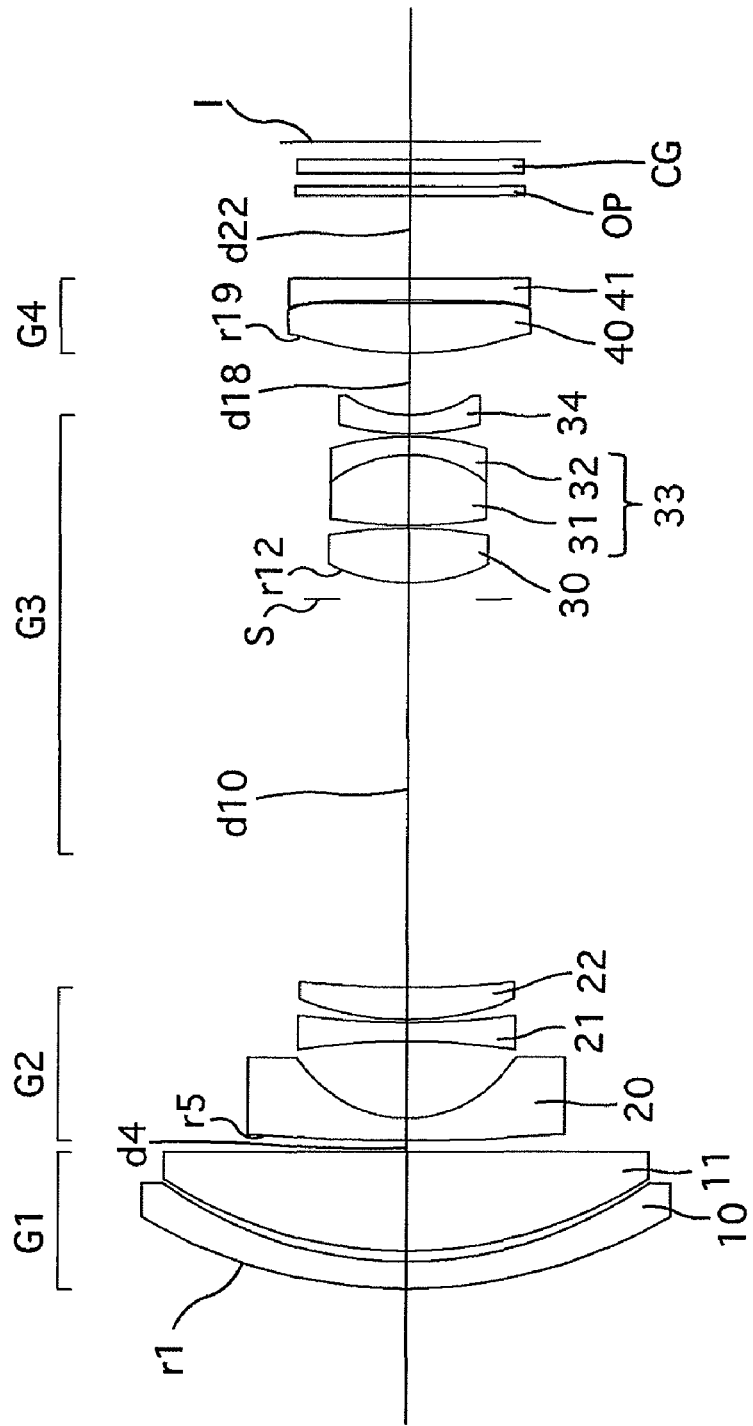
FIG. 11 shows a lens arrangement of the zoom lens system, according to the second embodiment of the present invention, at the short focal length extremity, when an object at infinity is in an in-focus state.
Figure 12:
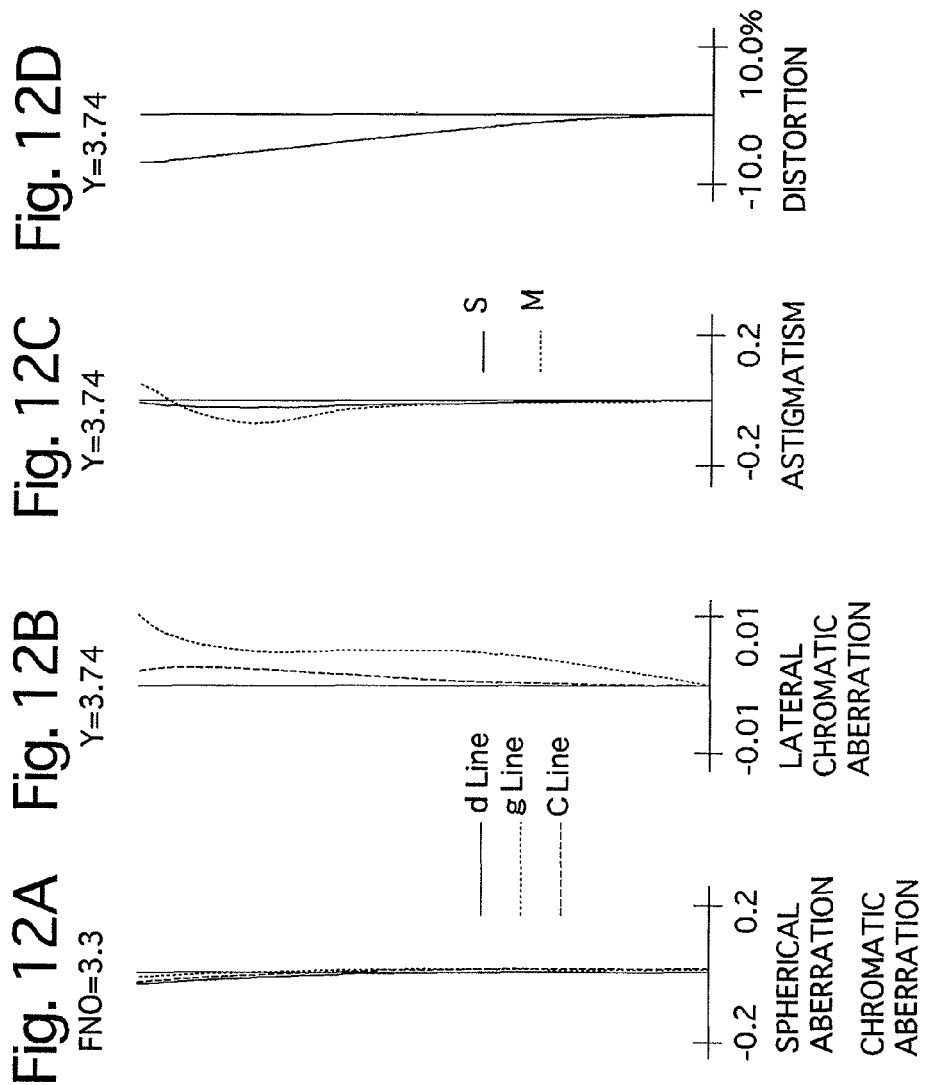
FIGS. 12A, 12B, 12C and 12D show aberration s occurred in the lens arrangement shown in FIG. 11.

FIG. 11 shows the lens arrangement of the zoom lens system, according to the second embodiment of the present invention, at the short focal length extremity, when an object at infinity is in an in-focus state. FIGS. 12A through 12D show aberrations occurred in the lens arrangement shown in FIG. 11.

Table 5 shows the lens surface data, Table 6 shows the aspherical surface data, Table 7 shows various zoom lens system data, and Table 8 shows the zoom lens group data of the second embodiment.

In the second embodiment, the lens arrangements of the first to fourth lens groups are different from those of the first embodiment.

The positive first lens group G1 (surface Nos. 1 through 4) is composed of a negative meniscus lens element 10 having the convex surface facing toward the object, and a positive planoconvex lens element 11 having the convex surface facing toward the object, in this order from the object.

The negative second lens group G2 (surface Nos. 5 through 10) is composed of a negative biconcave lens element 20, a biconcave negative lens element 21, and a positive meniscus lens element 22 having the convex surface facing toward the object, in this order from the object. The biconcave negative lens element 20 is provided with an aspherical surface on both sides thereof.

The positive third lens group G3 (surface Nos. 12 through 18) is composed of a biconvex positive lens element 30, a cemented lens 33 having a positive convex lens element 31 and a negative meniscus lens element 32 having the convex surface facing toward the image, in this order from the object, and a negative meniscus lens element 34 having the convex surface facing toward the object, in this order from the object. The biconvex positive lens element 30 has an aspherical surface on both sides thereof.

The positive fourth lens group G4 (surface Nos. 19 through 22) is composed of a biconvex lens element 40, and a negative planoconcave lens element 41 having the concave surface facing toward the object, in this order from the object. The biconvex lens element 40 has an aspherical surface on both sides thereof. The negative planoconcave lens element 41 has an aspherical surface on the object side thereof.

TABLE 5

| LENS SURFACE DATA | | | | |
|---|---|---|---|---|
| Surf. No. | R | d | Nd | vd |
| 1 | 19.823 | 1.000 | 1.92286 | 20.9 |
| 2 | 15.658 | 0.390 | | |
| 3 | 16.700 | 3.690 | 1.61800 | 63.4 |
| 4 | ∞ | d4 | | |
| 5* | −800.000 | 0.800 | 1.85135 | 40.1 |
| 6* | 4.940 | 2.880 | | |
| 7 | −25.362 | 0.700 | 1.72916 | 54.7 |
| 8 | 34.964 | 0.100 | | |
| 9 | 11.153 | 1.200 | 1.94595 | 18.0 |
| 10 | 41.616 | d10 | | |
| 11(Diaphragm) | ∞ | 0.600 | | |
| 12* | 6.314 | 2.060 | 1.59201 | 67.0 |
| 13* | −16.176 | 0.100 | | |
| 14 | 18.580 | 2.630 | 1.51823 | 59.0 |
| 15 | −4.746 | 0.700 | 1.90366 | 31.3 |
| 16 | −9.763 | 0.100 | | |
| 17 | 10.014 | 0.700 | 1.90366 | 31.3 |
| 18 | 4.282 | d18 | | |
| 19* | 12.895 | 1.890 | 1.54358 | 55.7 |
| 20* | −35.920 | 0.100 | | |
| 21* | −26.942 | 0.800 | 1.60641 | 27.2 |
| 22 | ∞ | d22 | | |
| 23 | ∞ | 0.350 | 1.51680 | 64.2 |
| 24 | ∞ | 0.510 | | |
| 25 | ∞ | 0.500 | 1.51680 | 64.2 |
| 26 | ∞ | — | | |

The symbol * designates the aspherical surface which is rotationally symmetrical with respect to the optical axis.

TABLE 6

ASPHERICAL SURFACE DATA
The aspherical surface coefficients not indicated are zero (0.00)):

| Surf. No. | K | A4 | A6 | A8 | A10 |
|---|---|---|---|---|---|
| 5 | 0.000 | $0.6896 \times 10^{-3}$ | $-0.2313 \times 10^{-4}$ | $0.3095 \times 10^{-6}$ | $-0.1657 \times 10^{-8}$ |
| 6 | 0.000 | $0.6199 \times 10^{-3}$ | $-0.7488 \times 10^{-5}$ | $0.1238 \times 10^{-5}$ | $-0.1513 \times 10^{-6}$ |
| 12 | −1.000 | $-0.2213 \times 10^{-3}$ | $0.2536 \times 10^{-4}$ | $-0.8616 \times 10^{-6}$ | |
| 13 | 0.000 | $-0.8135 \times 10^{-5}$ | $0.1802 \times 10^{-4}$ | $-0.1399 \times 10^{-5}$ | |
| 19 | 0.000 | $0.8489 \times 10^{-4}$ | $-0.1786 \times 10^{-4}$ | $0.5293 \times 10^{-6}$ | $-0.1479 \times 10^{-7}$ |
| 20 | 0.000 | $0.3445 \times 10^{-2}$ | $-0.2837 \times 10^{-3}$ | $0.5749 \times 10^{-5}$ | $0.1908 \times 10^{-8}$ |
| 21 | 0.000 | $0.3072 \times 10^{-2}$ | $-0.2355 \times 10^{-3}$ | $0.4574 \times 10^{-5}$ | $0.1637 \times 10^{-7}$ |

TABLE 7

ZOOM LENS SYSTEM DATA
Zoom Ratio 9.55

| | Short Focal Length Extremity |
|---|---|
| FNO. | 3.3 |
| f | 4.40 |
| W | 42.8 |
| Y | 3.74 |

TABLE 7-continued

ZOOM LENS SYSTEM DATA
Zoom Ratio 9.55

| | |
|---|---|
| fB | 0.59 |
| L | 42.69 |
| d4 | 0.420 |
| d10 | 14.499 |
| d18 | 2.314 |
| d22 | 3.072 |

Intermediate Focal Length

| | |
|---|---|
| FNO. | 4.8 |
| f | 15.99 |
| W | 13.4 |
| Y | 3.98 |
| fB | 0.59 |
| L | 50.50 |
| d4 | 11.885 |
| d10 | 4.202 |
| d18 | 5.432 |
| d22 | 6.613 |

Long Focal Length Extremity

| | |
|---|---|
| FNO. | 5.8 |
| f | 42.00 |
| W | 5.5 |
| Y | 4.17 |
| fB | 0.59 |
| L | 64.00 |
| d4 | 18.641 |
| d10 | 1.400 |
| d18 | 19.569 |
| d22 | 2.000 |

TABLE 8

ZOOM LENS GROUP DATA

| Lens Group | First Surface | Focal Length |
|---|---|---|
| 1 | 1 | 39.51 |
| 2 | 5 | −6.61 |
| 3 | 12 | 9.76 |
| 4 | 19 | 28.34 |

[Embodiment 3]

Figure 13:
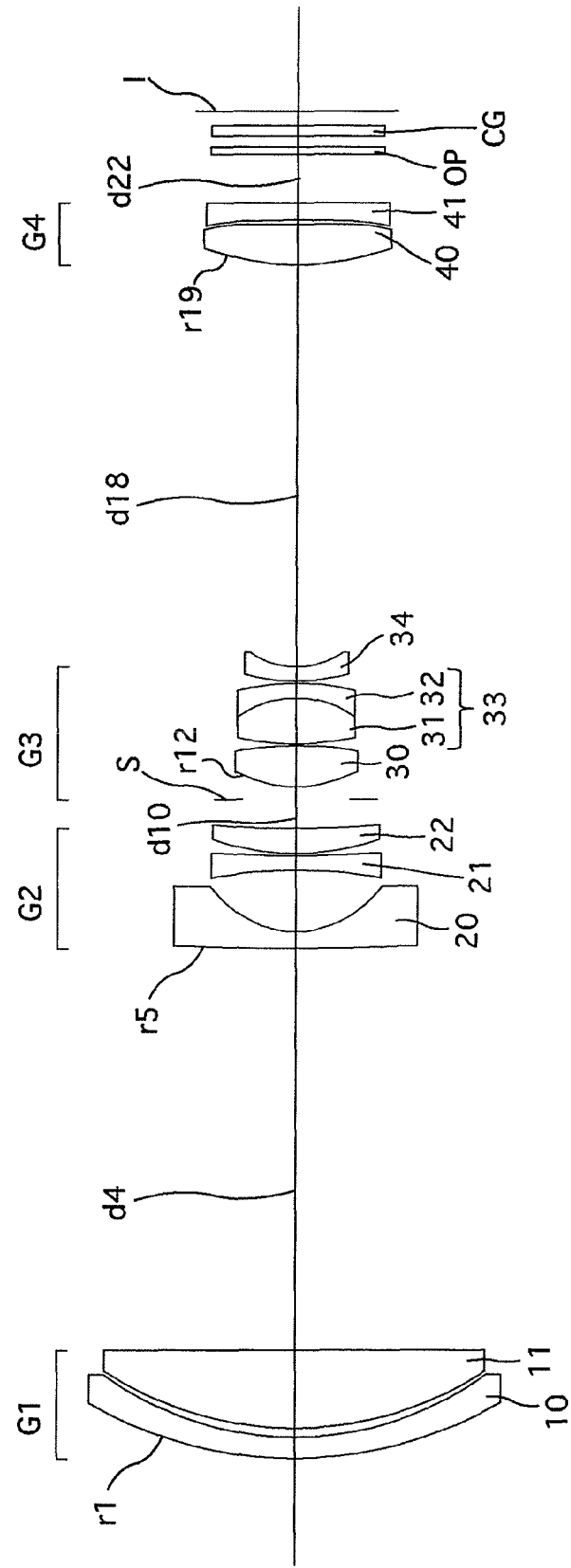
FIG. 13 shows a lens arrangement of the zoom lens system, according to a third embodiment of the present invention, at the long focal length extremity, when an object at infinity is in an in-focus state.
Figure 14:
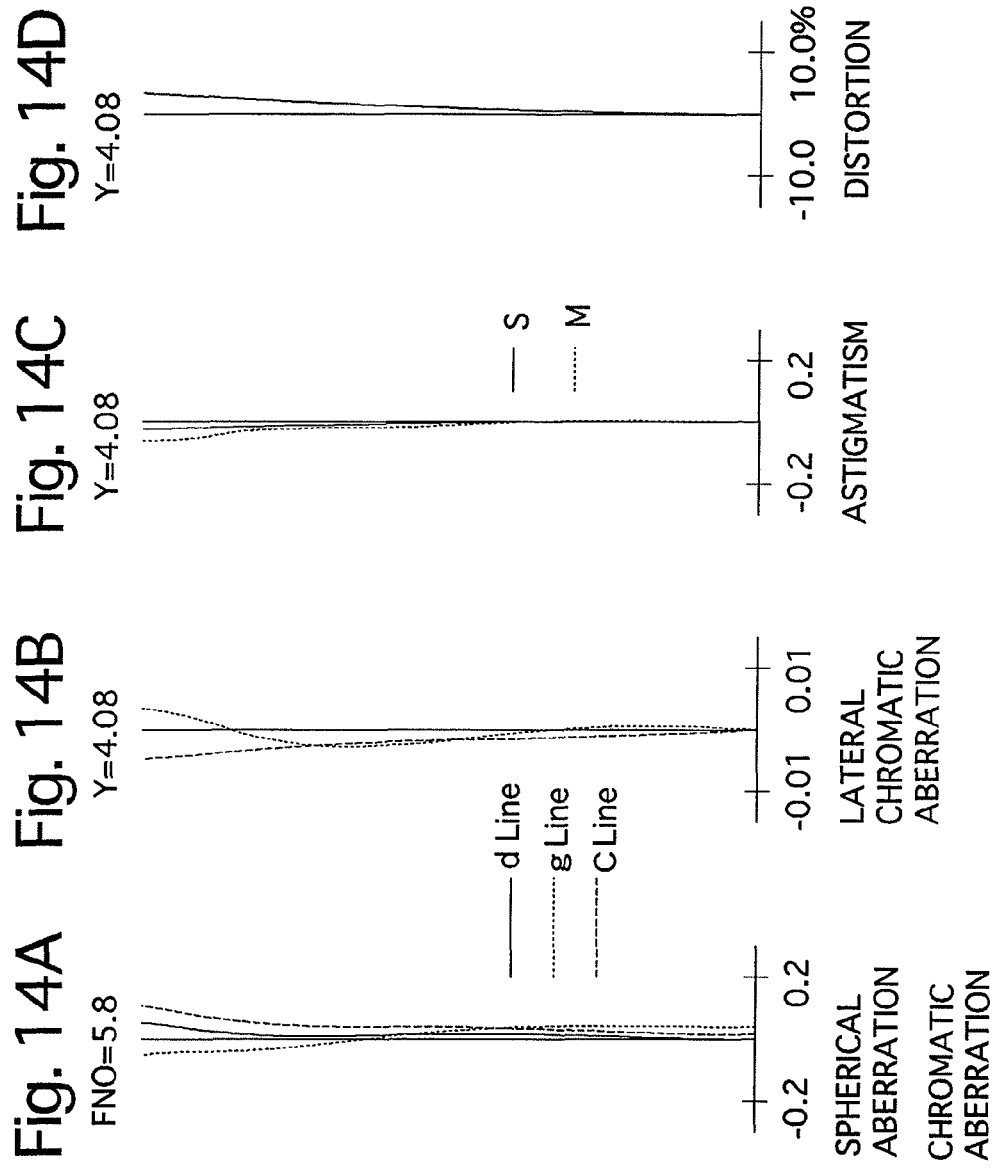
FIGS. 14A, 14B, 14C and 14D show aberrations occurred in the lens arrangement shown in FIG. 13.

FIG. 13 shows the lens arrangement of the zoom lens system, according to a third embodiment of the present invention, at the long focal length extremity, when an object at infinity is in an in-focus state. FIGS. 14A through 14D show aberrations occurred in the lens arrangement shown in FIG. 13.

Figure 15:
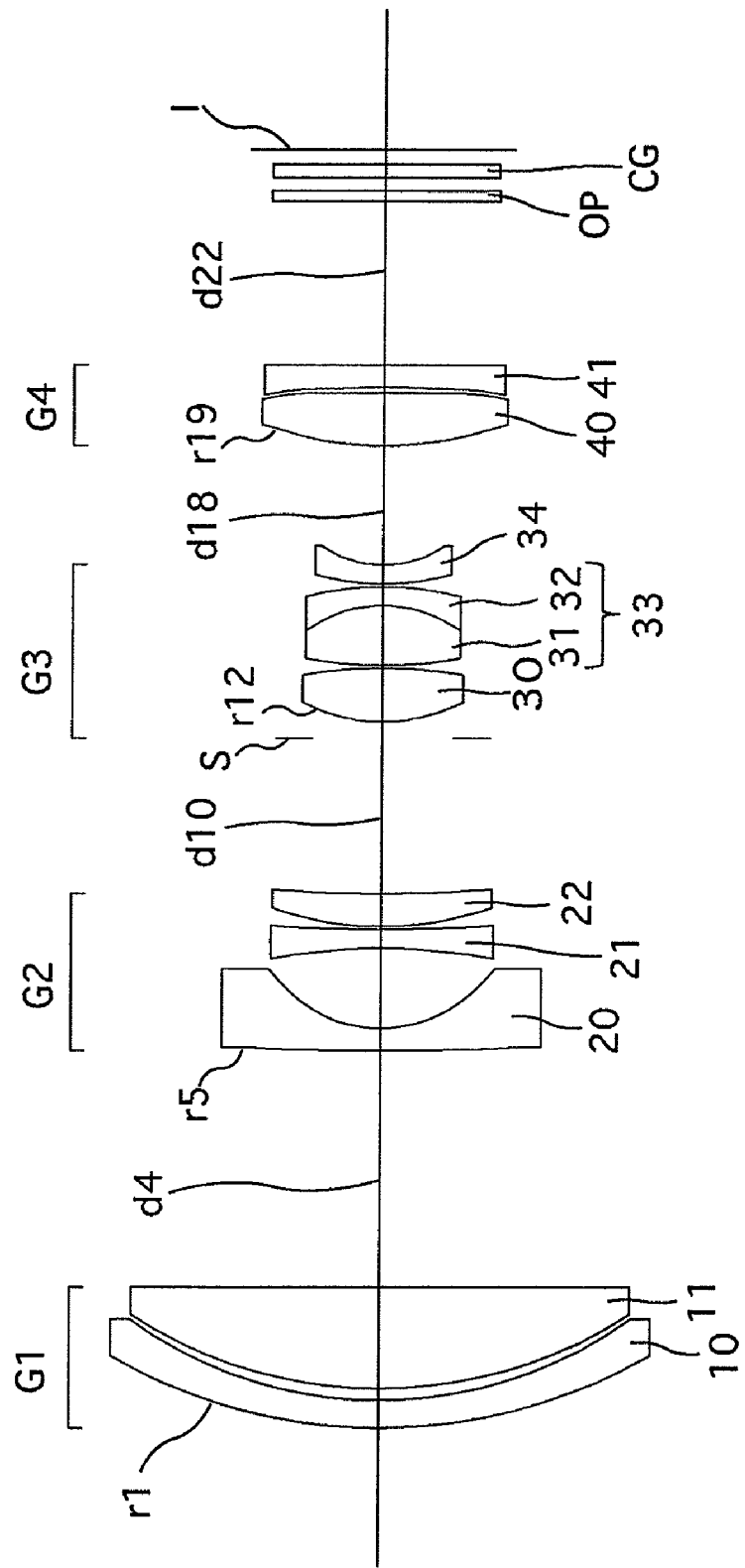
FIG. 15 shows a lens arrangement of the zoom lens system, according to the third embodiment of the present invention, at an intermediate focal length position, when an object at infinity is in an in-focus state.
Figure 16:
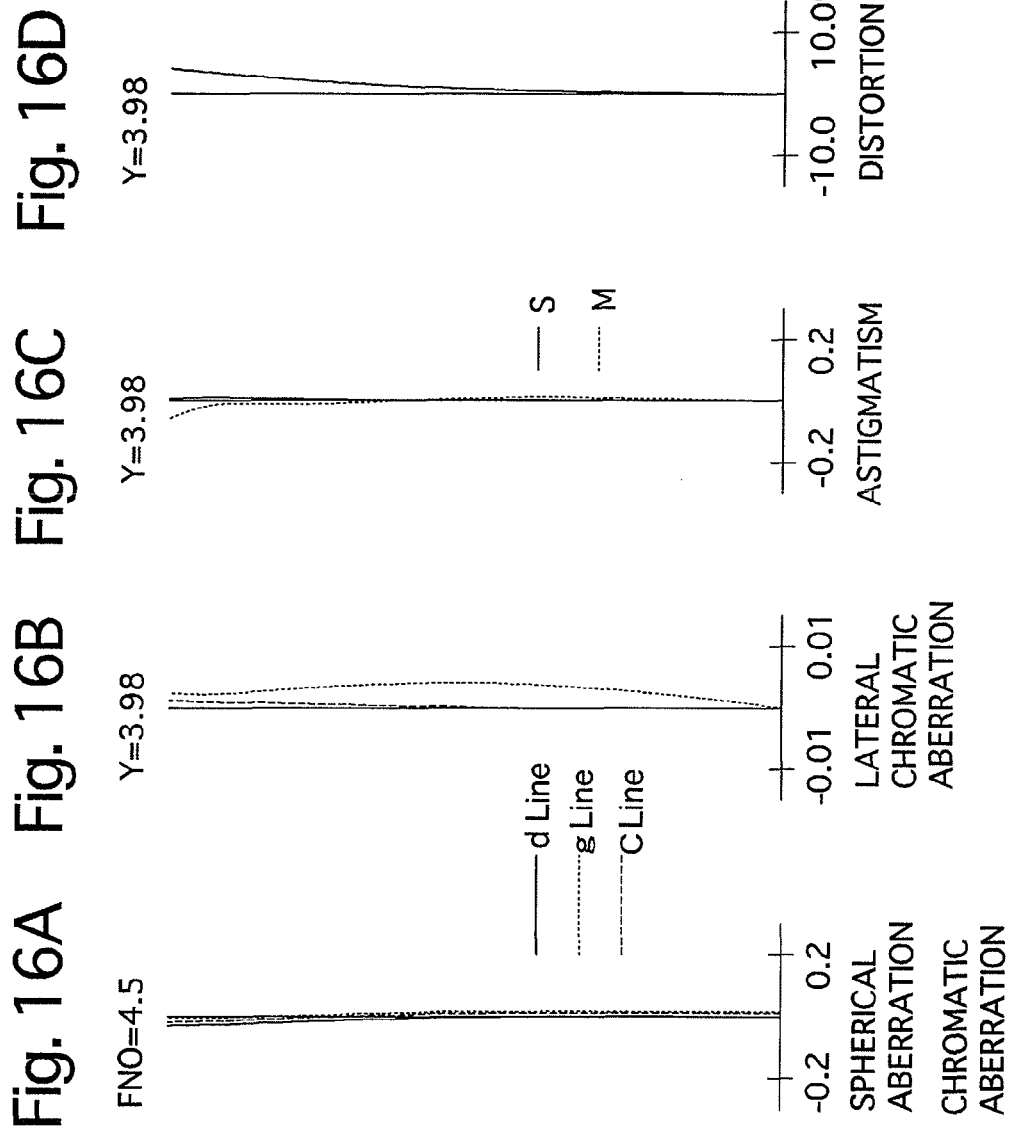
FIGS. 16A, 16B, 16C and 16D show aberrations occurred in the lens arrangement shown in FIG. 15.

FIG. 15 shows the lens arrangement of the zoom lens system, according to a third embodiment of the present invention, at an intermediate focal length position, when an object at infinity is in an in-focus state. FIGS. 16A through 16D show aberrations occurred in the lens arrangement shown in FIG. 15.

Figure 17:
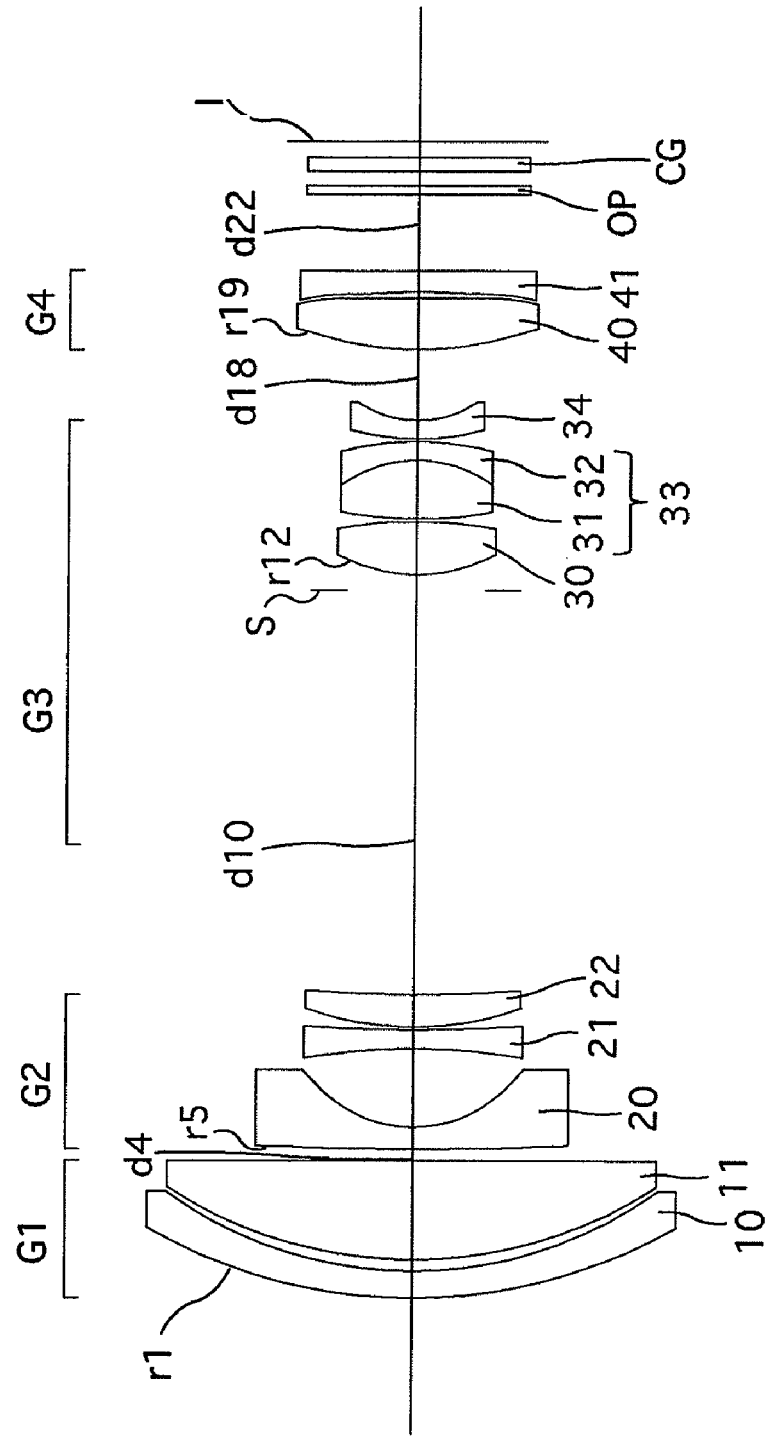
FIG. 17 shows a lens arrangement of the zoom lens system, according to the third embodiment of the present invention, at the short focal length extremity, when an object at infinity is in an in-focus state.
Figure 18:
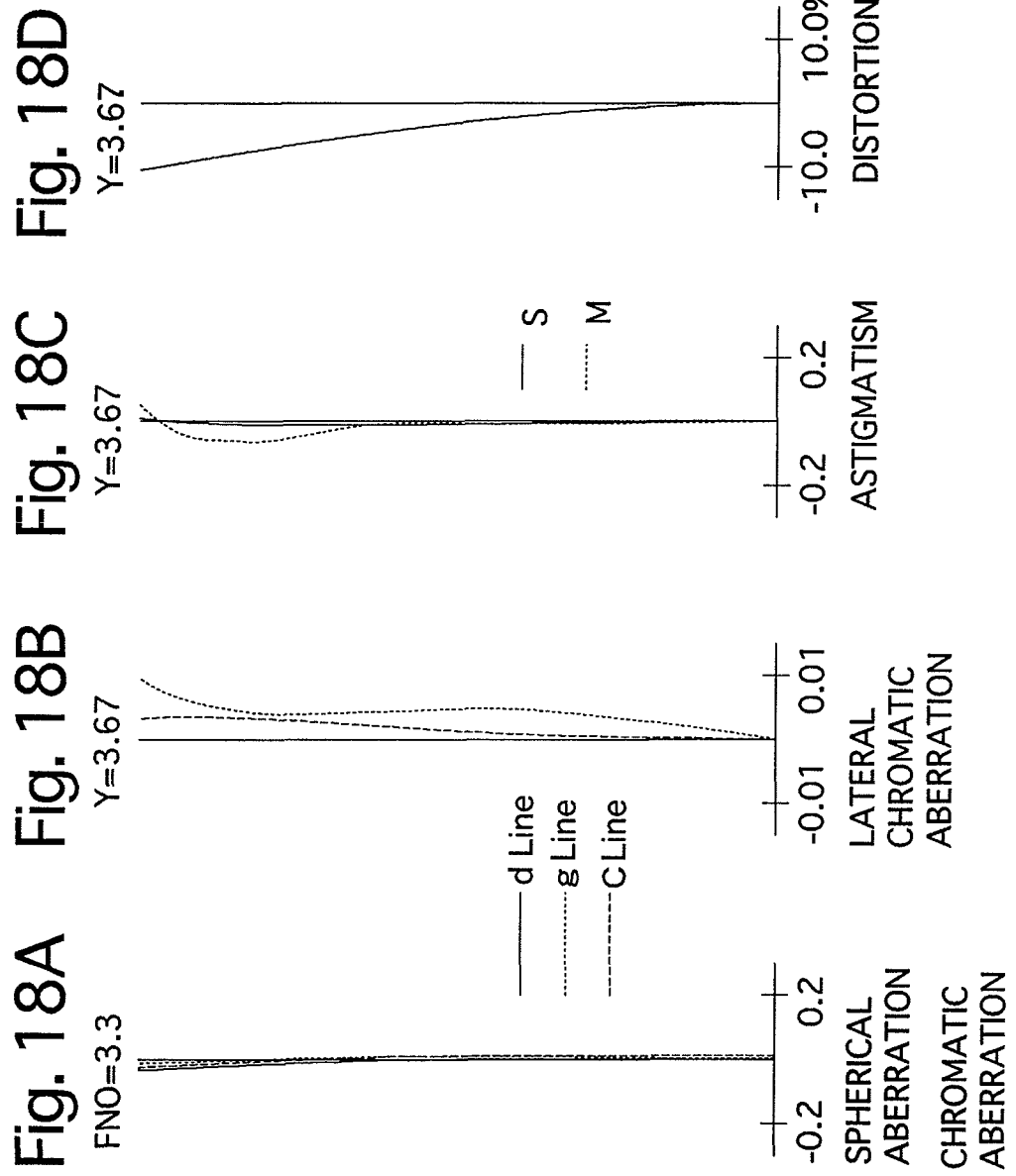
FIGS. 18A, 18B, 18C and 18D show aberration s occurred in the lens arrangement shown in FIG. 17.

FIG. 17 shows the lens arrangement of the zoom lens system, according to the third embodiment of the present invention, at the short focal length extremity, when an object at infinity is in an in-focus state. FIGS. 18A, 18B, 18C and 18D show aberrations occurred in the lens arrangement shown in FIG. 17.

Table 9 shows the lens surface data, Table 10 shows the aspherical surface data, Table 11 shows various zoom lens system data, and Table 12 shows the zoom lens group data of the third embodiment.

The lens arrangement of the third embodiment is the same as that of the second embodiment.

TABLE 9

LENS SURFACE DATA

| Surf. No. | R | d | Nd | vd |
|---|---|---|---|---|
| 1 | 19.984 | 1.000 | 1.92286 | 20.9 |
| 2 | 15.856 | 0.423 | | |
| 3 | 16.995 | 3.671 | 1.61800 | 63.4 |
| 4 | ∞ | d4 | | |
| 5* | −1000.000 | 0.800 | 1.85135 | 40.1 |
| 6* | 4.914 | 2.925 | | |
| 7 | −23.063 | 0.700 | 1.72916 | 54.7 |
| 8 | 59.508 | 0.100 | | |
| 9 | 12.060 | 1.200 | 1.94595 | 18.0 |
| 10 | 47.908 | d10 | | |
| 11 (Diaphragm) | ∞ | 0.600 | | |
| 12* | 5.949 | 1.965 | 1.59201 | 67.0 |
| 13* | −17.424 | 0.100 | | |
| 14 | 14.890 | 2.179 | 1.48749 | 70.4 |
| 15 | −4.830 | 0.700 | 1.83400 | 37.3 |
| 16 | −11.543 | 0.100 | | |
| 17 | 8.999 | 0.700 | 1.90366 | 31.3 |
| 18 | 4.015 | d18 | | |
| 19* | 12.316 | 1.938 | 1.54358 | 55.7 |
| 20* | −33.671 | 0.201 | | |
| 21* | −23.762 | 0.800 | 1.60641 | 27.2 |
| 22 | ∞ | d22 | | |
| 23 | ∞ | 0.350 | 1.51680 | 64.2 |
| 24 | ∞ | 0.510 | | |
| 25 | ∞ | 0.500 | 1.51680 | 64.2 |
| 26 | ∞ | — | | |

The symbol * designates the aspherical surface which is rotationally symmetrical with respect to the optical axis.

TABLE 10

ASPHERICAL SURFACE DATA
The aspherical surface coefficients not indicated are zero (0.00)):

| Surf. No. | K | A4 | A6 | A8 | A10 |
|---|---|---|---|---|---|
| 5 | 0.000 | $0.5072 \times 10^{-3}$ | $-0.1810 \times 10^{-4}$ | $0.2317 \times 10^{-6}$ | $-0.1080 \times 10^{-8}$ |
| 6 | 0.000 | $0.3182 \times 10^{-3}$ | $-0.1767 \times 10^{-4}$ | $0.1414 \times 10^{-5}$ | $-0.1590 \times 10^{-6}$ |
| 12 | −1.000 | $-0.1888 \times 10^{-3}$ | $0.2653 \times 10^{-4}$ | $-0.1412 \times 10^{-5}$ | |
| 13 | 0.000 | $-0.1470 \times 10^{-3}$ | $0.1841 \times 10^{-4}$ | $-0.2146 \times 10^{-5}$ | |
| 19 | 0.000 | $0.2723 \times 10^{-3}$ | $-0.2936 \times 10^{-4}$ | $0.4086 \times 10^{-6}$ | |
| 20 | 0.000 | $0.3605 \times 10^{-2}$ | $-0.3182 \times 10^{-3}$ | $0.7374 \times 10^{-5}$ | $-0.7084 \times 10^{-8}$ |
| 21 | 0.000 | $0.3049 \times 10^{-2}$ | $-0.2560 \times 10^{-3}$ | $0.6027 \times 10^{-5}$ | |

TABLE 11

ZOOM LENS SYSTEM DATA
Zoom Ratio 9.55

Short Focal Length Extremity

| | |
|---|---|
| FNO. | 3.3 |
| f | 4.40 |
| W | 43.0 |
| Y | 3.67 |
| fB | 0.59 |
| L | 43.00 |
| d4 | 0.420 |
| d10 | 15.066 |
| d18 | 2.632 |
| d22 | 2.831 |

Intermediate Focal Length

| | |
|---|---|
| FNO. | 4.5 |
| f | 11.90 |
| W | 17.8 |
| Y | 3.98 |
| fB | 0.59 |
| L | 46.71 |
| d4 | 8.611 |
| d10 | 5.692 |
| d18 | 4.361 |
| d22 | 5.996 |

Long Focal Length Extremity

| | |
|---|---|
| FNO. | 5.8 |
| f | 42.00 |
| W | 5.4 |
| Y | 4.08 |
| fB | 0.59 |
| L | 64.00 |
| d4 | 19.050 |
| d10 | 1.400 |
| d18 | 19.177 |
| d22 | 2.321 |

TABLE 12

ZOOM LENS GROUP DATA

| Lens Group | First Surface | Focal Length |
|---|---|---|
| 1 | 1 | 39.95 |
| 2 | 5 | −6.78 |
| 3 | 12 | 9.93 |
| 4 | 19 | 28.10 |

[Embodiment 4]

Figure 19:
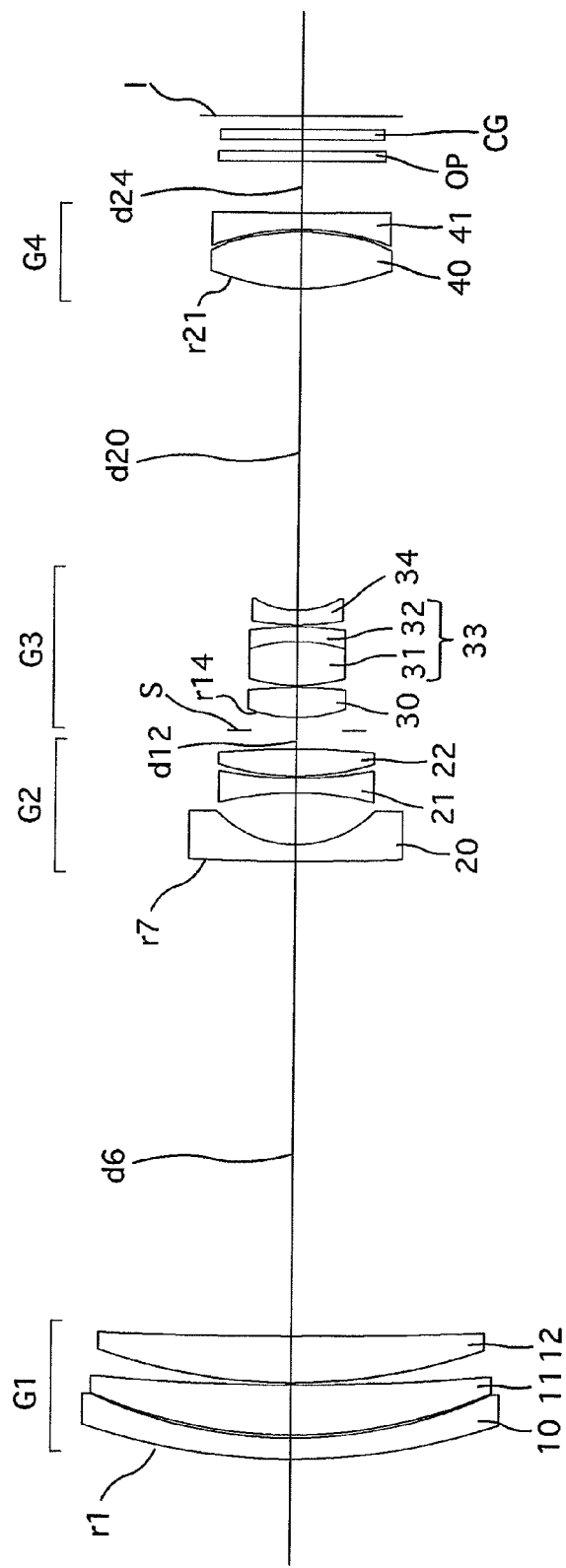
FIG. 19 shows a lens arrangement of the zoom lens system, according to a fourth embodiment of the present invention, at the long focal length extremity, when an object at infinity is in an in-focus state.
Figure 20:
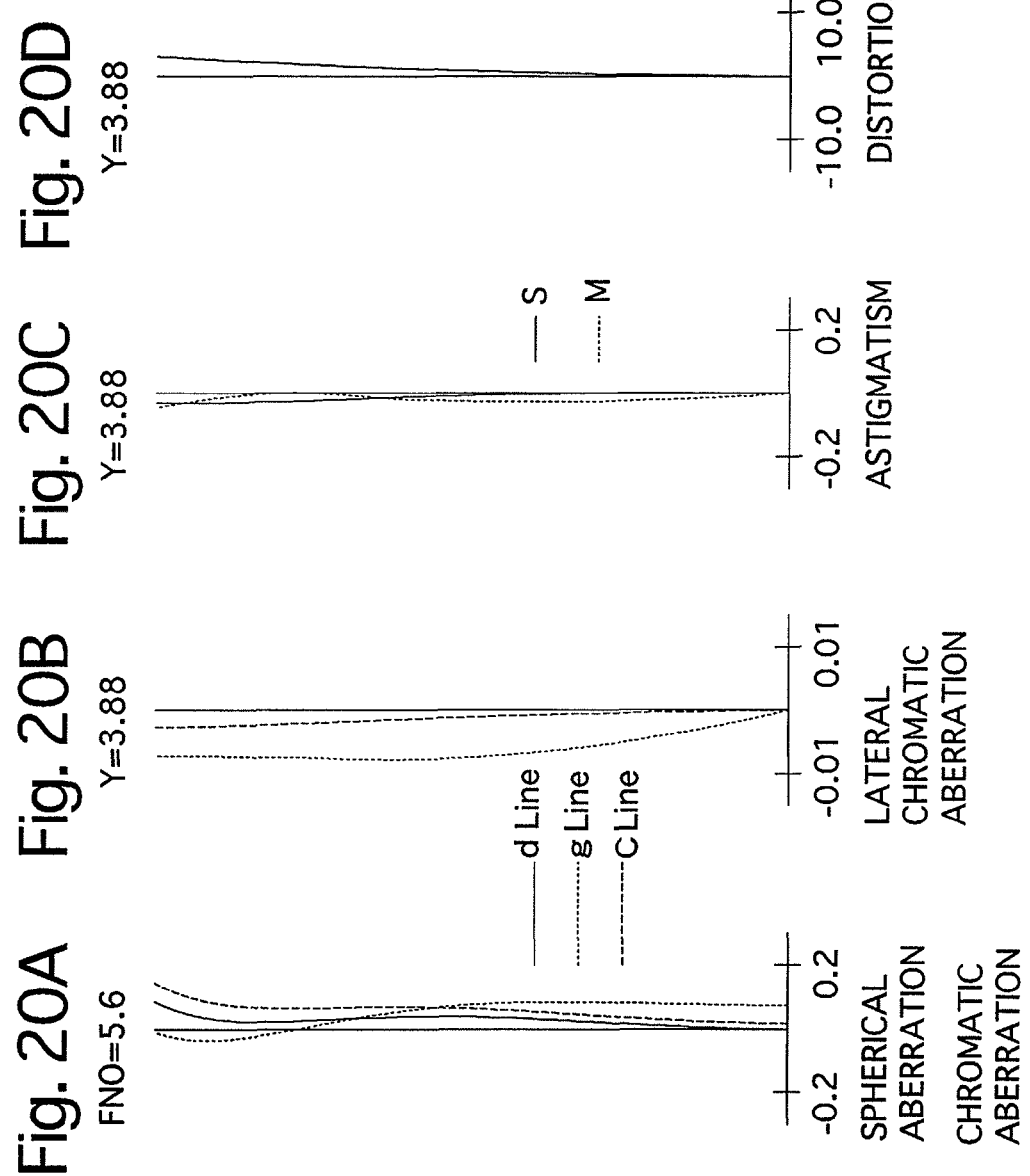
FIGS. 20A, 20B, 20C and 20D show aberrations occurred in the lens arrangement shown in FIG. 19.

FIG. 19 shows the lens arrangement of the zoom lens system, according to a fourth embodiment of the present invention, at the long focal length extremity, when an object at infinity is in an in-focus state. FIGS. 20A through 20D show aberrations occurred in the lens arrangement shown in FIG. 19.

Figure 21:
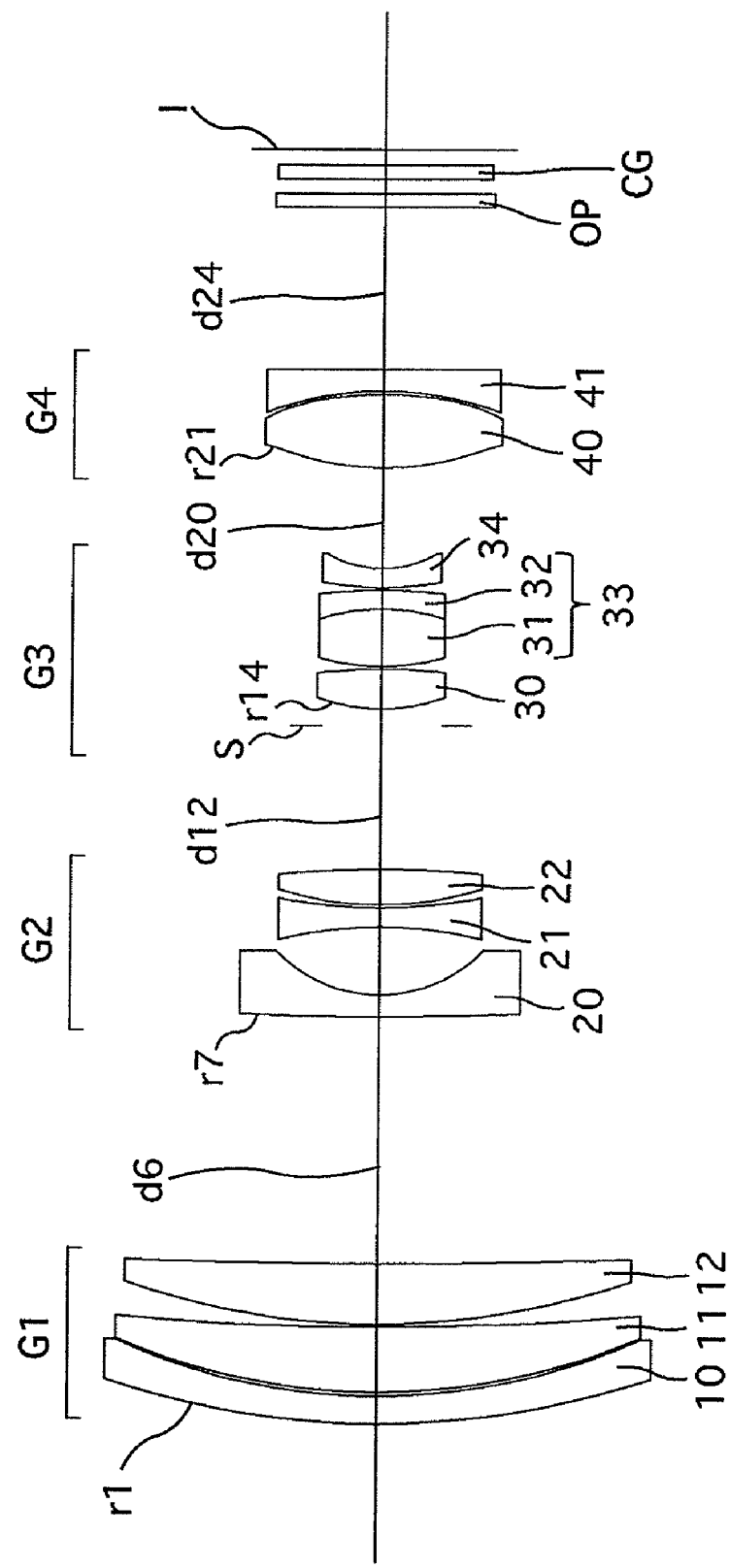
FIG. 21 shows a lens arrangement of the zoom lens system, according to the fourth embodiment of the present invention, at an intermediate focal length position, when an object at infinity is in an in-focus state.
Figure 22:
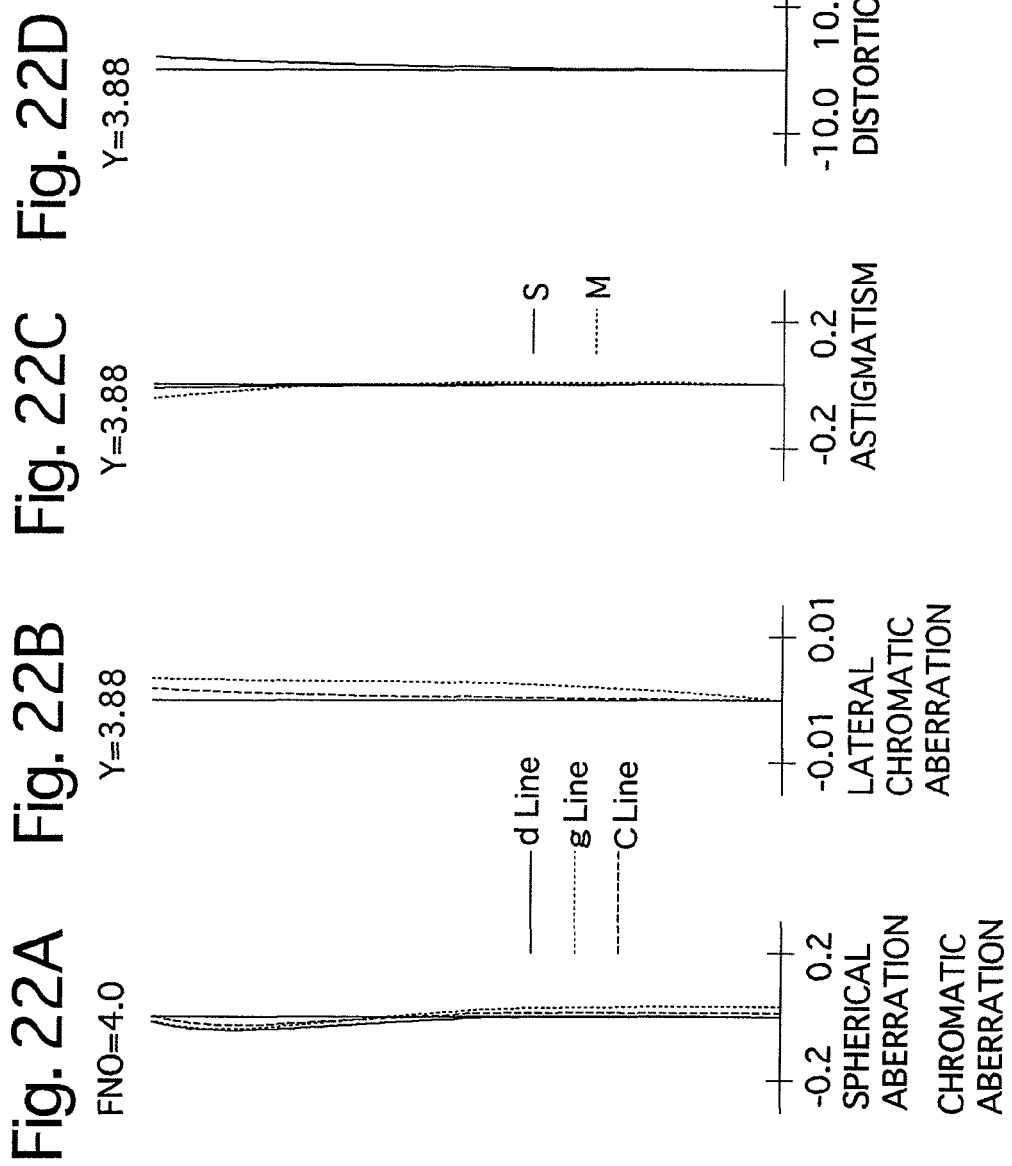
FIGS. 22A, 22B, 22C and 22D show aberrations occurred in the lens arrangement shown in FIG. 21.

FIG. 21 shows the lens arrangement of the zoom lens system, according to a fourth embodiment of the present invention, at an intermediate focal length position, when an object at infinity is in an in-focus state. FIGS. 22A through 22D show aberrations occurred in the lens arrangement shown in FIG. 21.

Figure 23:
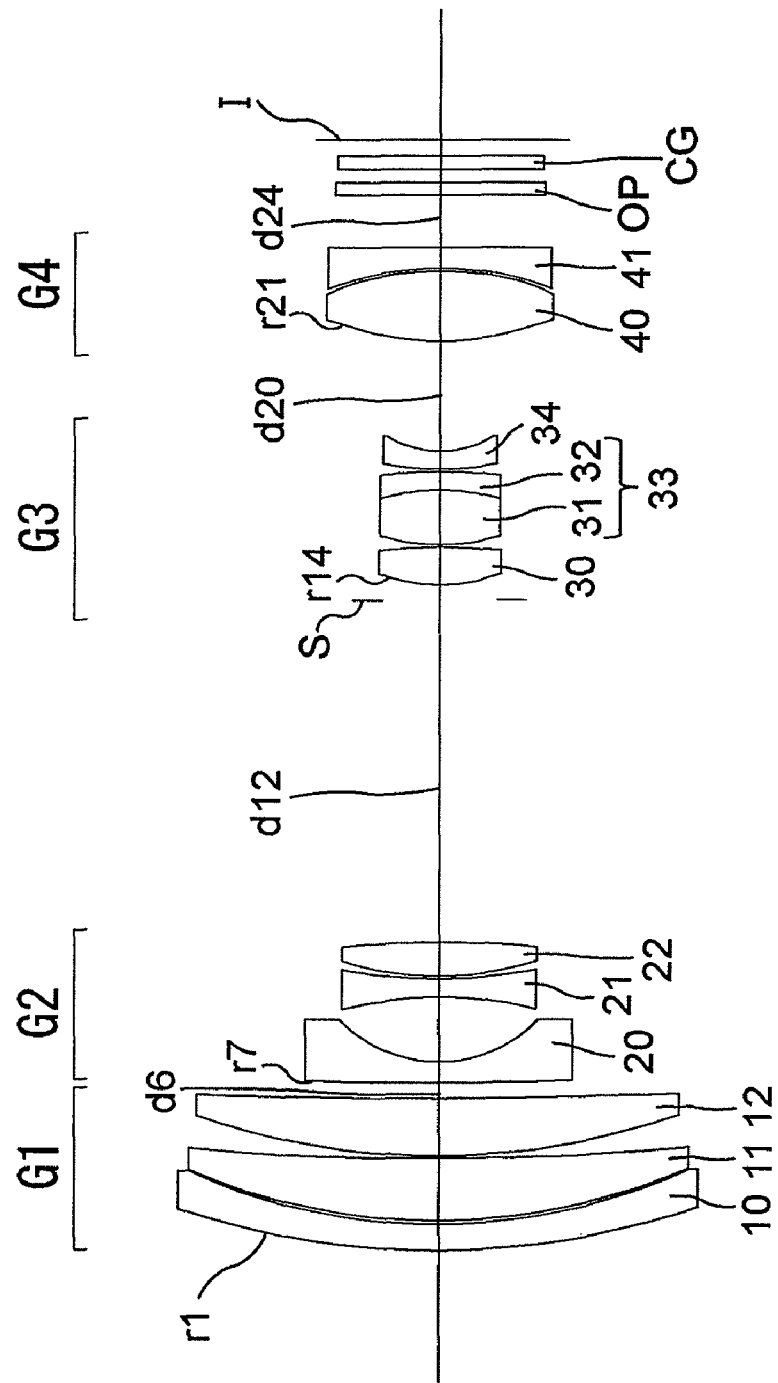
FIG. 23 shows a lens arrangement of the zoom lens system, according to the fourth embodiment of the present invention, at the short focal length extremity, when an object at infinity is in an in-focus state.
Figure 24:
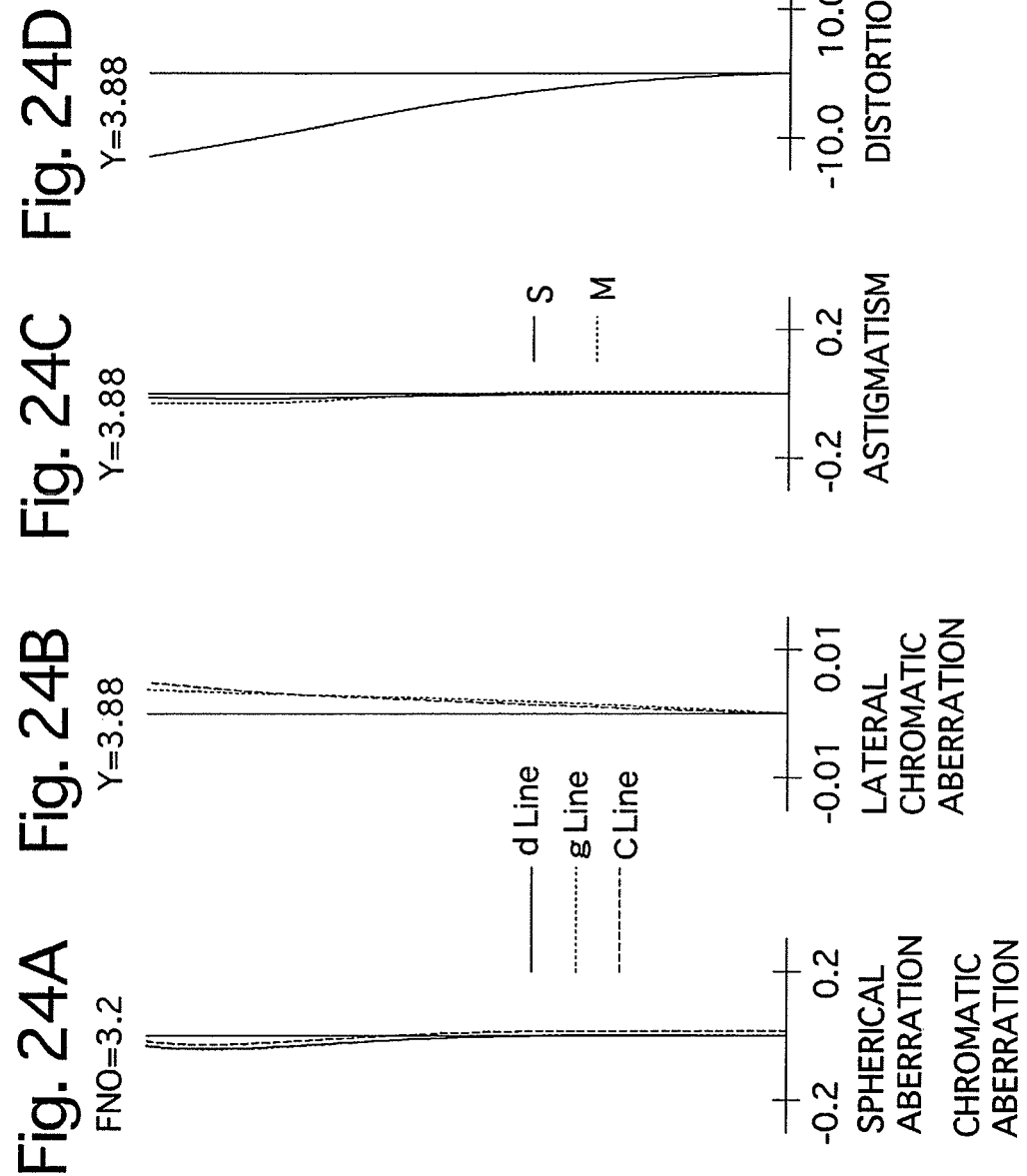
FIGS. 24A, 24B, 24C and 24D show aberration occurred in the lens arrangement shown in FIG. 23.

FIG. 23 shows the lens arrangement of the zoom lens system, according to the fourth embodiment of the present invention, at the short focal length extremity, when an object at infinity is in an in-focus state. FIGS. 24A through 24D show aberrations occurred in the lens arrangement shown in FIG. 23.

Table 13 shows the lens surface data, Table 14 shows the aspherical surface data, Table 15 shows various zoom lens system data, and Table 16 shows the zoom lens group data of the fourth embodiment.

In the fourth embodiment, the lens arrangements of the second to fourth lens groups are different from those of the first embodiment. The remaining lens arrangement is the same as that of the first embodiment, and hence duplicate explanations have been omitted.

In the negative second lens group G2, the positive lens element 22 (surface Nos. 11 and 12) of is a biconvex positive lens element.

The positive third lens group G3 (surface Nos. 14 through 20) is composed of a biconvex positive lens element 30, a cemented lens 33 having a biconvex positive lens element 31 and a negative meniscus lens element 32 having the convex surface facing toward the image, and a negative meniscus lens element 34 having the convex surface facing toward the object, in this order from the object.

In the positive fourth lens group G4, the negative lens element 41 (surface Nos. 23 and 24) is a biconcave negative lens element.

TABLE 13

| Surf. No. | R | d | Nd | vd |
|---|---|---|---|---|
| 1 | 31.314 | 1.000 | 1.92286 | 21.3 |
| 2 | 23.457 | 0.136 | | |
| 3 | 24.358 | 2.372 | 1.49700 | 81.6 |
| 4 | 111.473 | 0.100 | | |
| 5 | 28.318 | 2.190 | 1.61800 | 63.4 |
| 6 | 235.895 | d6 | | |
| 7 | 126.674 | 0.800 | 1.91082 | 35.2 |
| 8 | 5.311 | 2.483 | | |
| 9 | −14.935 | 0.700 | 1.80400 | 46.6 |
| 10 | 19.805 | 0.100 | | |
| 11 | 12.283 | 1.300 | 1.92286 | 21.3 |
| 12 | −40.734 | d12 | | |
| 13 (Diaphragm) | ∞ | 0.600 | | |
| 14* | 6.490 | 1.450 | 1.58989 | 66.8 |
| 15* | −19.803 | 0.100 | | |
| 16 | 8.189 | 2.100 | 1.48749 | 70.2 |
| 17 | −7.726 | 0.700 | 1.80440 | 39.6 |
| 18 | −19.268 | 0.100 | | |
| 19 | 11.956 | 0.700 | 1.90366 | 31.3 |
| 20 | 4.005 | d20 | | |
| 21* | 10.587 | 2.700 | 1.54358 | 55.7 |
| 22* | −10.293 | 0.100 | | |
| 23* | −10.594 | 0.800 | 1.60641 | 27.2 |
| 24 | 1070.337 | d24 | | |
| 25 | ∞ | 0.500 | 1.51633 | 64.1 |
| 26 | ∞ | 0.510 | | |
| 27 | ∞ | 0.500 | 1.51633 | 64.1 |
| 28 | ∞ | — | | |

The symbol * designates the aspherical surface which is rotationally symmetrical with respect to the optical axis.

TABLE 14

ASPHERICAL SURFACE DATA
The aspherical surface coefficients not indicated are zero (0.00)):

| Surf. No. | K | A4 | A6 | A8 | A10 |
|---|---|---|---|---|---|
| 14 | −1.000 | −0.1670 × 10$^{-3}$ | 0.3661 × 10$^{-4}$ | 0.3259 × 10$^{-6}$ | |
| 15 | 0.000 | 0.7868 × 10$^{-4}$ | 0.3017 × 10$^{-4}$ | 0.1098 × 10$^{-5}$ | |
| 21 | 0.000 | 0.1955 × 10$^{-4}$ | 0.1380 × 10$^{-5}$ | −0.8747 × 10$^{-6}$ | |
| 22 | 0.000 | 0.2867 × 10$^{-2}$ | −0.2701 × 10$^{-3}$ | 0.7365 × 10$^{-5}$ | −0.3305 × 10$^{-7}$ |
| 23 | 0.000 | 0.2547 × 10$^{-2}$ | −0.2331 × 10$^{-3}$ | 0.6382 × 10$^{-5}$ | |

TABLE 15

ZOOM LENS SYSTEM DATA
Zoom Ratio 9.66

Short Focal Length Extremity

| | |
|---|---|
| FNO. | 3.2 |
| f | 5.00 |
| W | 41.7 |
| Y | 3.88 |
| fB | 0.59 |
| L | 42.57 |
| d6 | 0.596 |
| d12 | 13.132 |
| d20 | 4.214 |
| d24 | 2.000 |

Intermediate Focal Length

| | |
|---|---|
| FNO. | 4.0 |
| f | 11.90 |
| W | 17.7 |
| Y | 3.88 |
| fB | 0.59 |
| L | 46.53 |
| d6 | 9.004 |
| d12 | 5.280 |
| d20 | 3.684 |
| d24 | 5.929 |

Long Focal Length Extremity

| | |
|---|---|
| FNO. | 5.6 |
| f | 48.30 |
| W | 4.5 |
| Y | 3.88 |
| fB | 0.59 |
| L | 64.00 |
| d6 | 22.615 |
| d12 | 0.900 |
| d20 | 15.402 |
| d24 | 2.454 |

TABLE 16

ZOOM LENS GROUP DATA

| Lens Group | First Surface | Focal Length |
|---|---|---|
| 1 | 1 | 39.65 |
| 2 | 7 | −6.76 |
| 3 | 14 | 10.03 |
| 4 | 21 | 21.10 |

[Embodiment 5]

Figure 25:
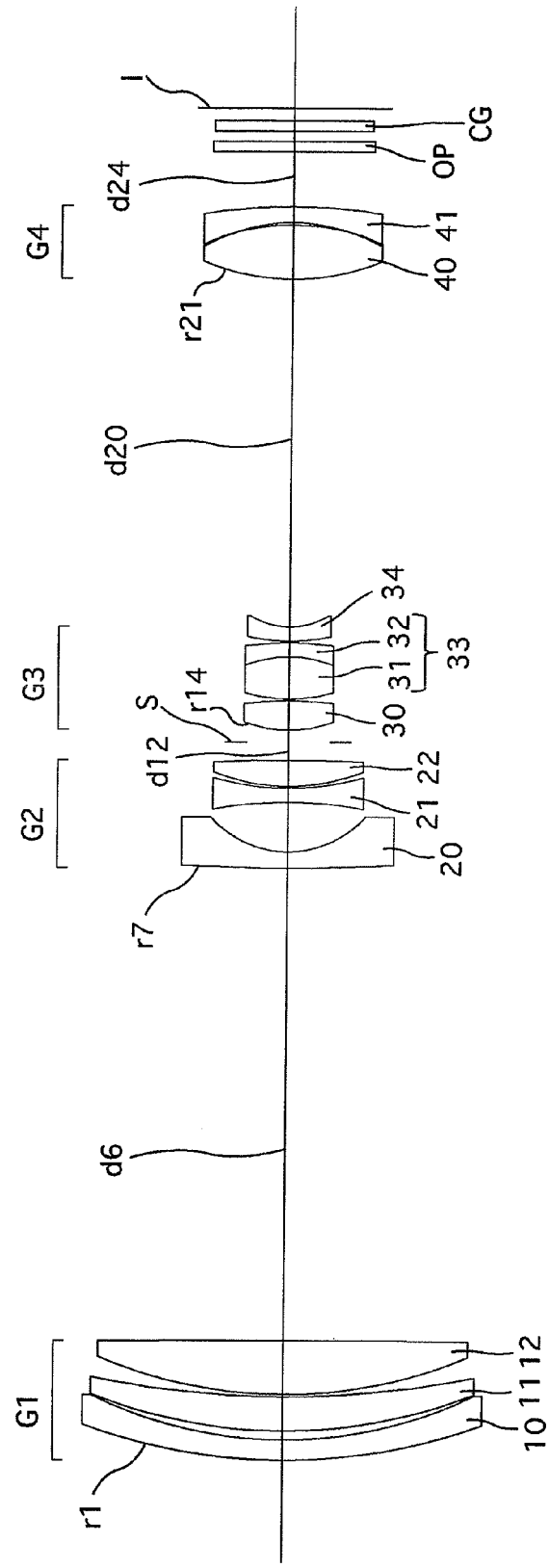
FIG. 25 shows a lens arrangement of the zoom lens system, according to a fifth embodiment of the present invention, at the long focal length extremity, when an object at infinity is in an in-focus state.
Figure 26:
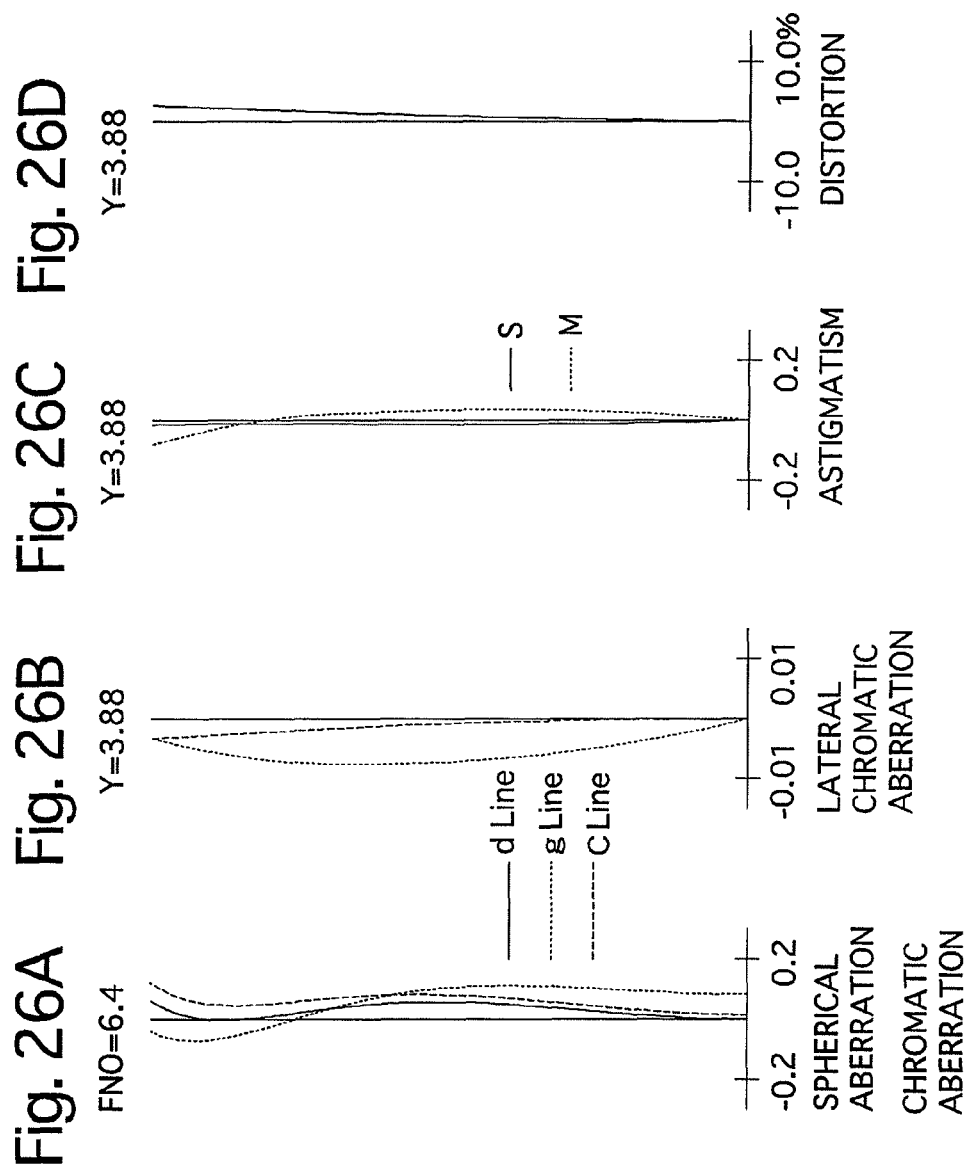
FIGS. 26A, 26B, 26C and 26D show aberrations occurred in the lens arrangement shown in FIG. 25.

FIG. 25 shows the lens arrangement of the zoom lens system, according to a fifth embodiment of the present invention, at the long focal length extremity, when an object at infinity is in an in-focus state. FIGS. 26A through 26D show aberrations occurred in the lens arrangement shown in FIG. 25.

Figure 27:
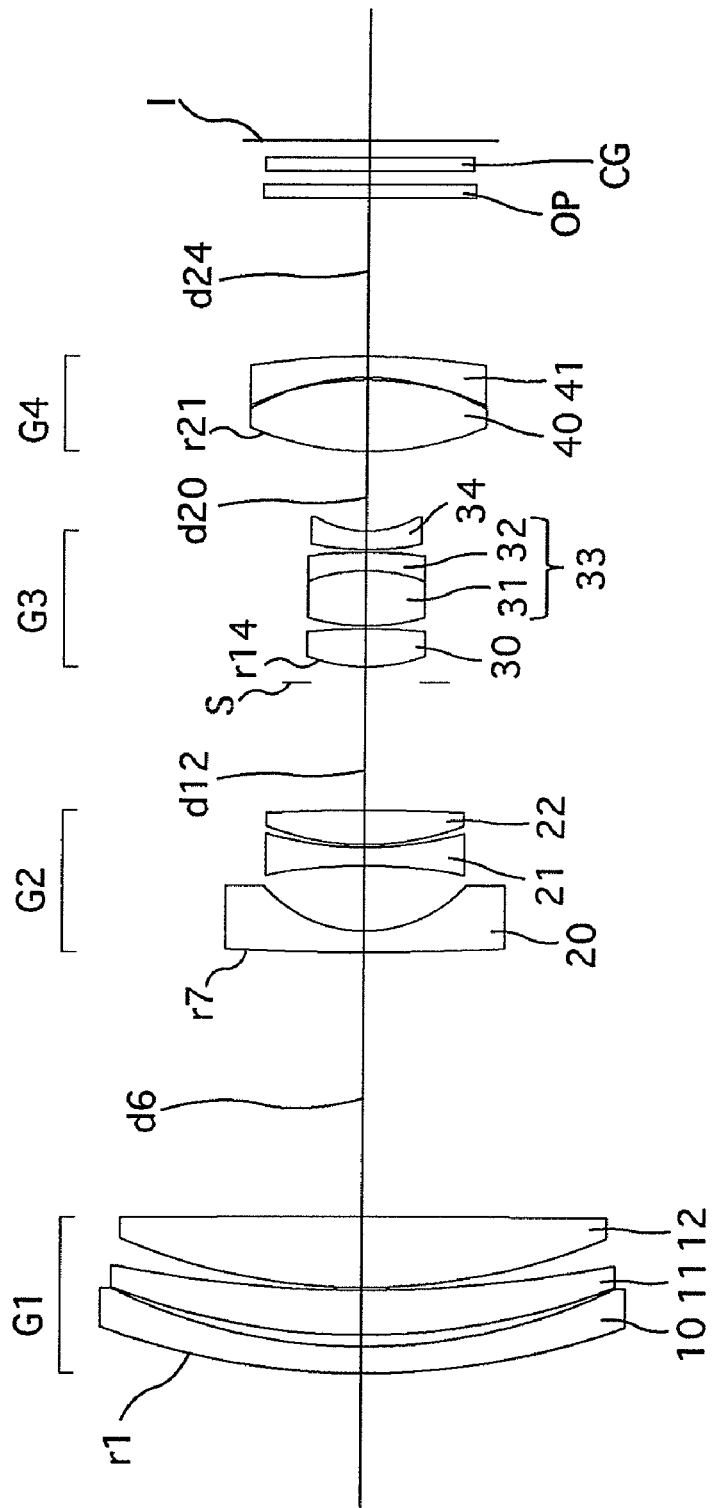
FIG. 27 shows a lens arrangement of the zoom lens system, according to the fifth embodiment of the present invention, at an intermediate focal length position, when an object at infinity is in an in-focus state.
Figure 28:
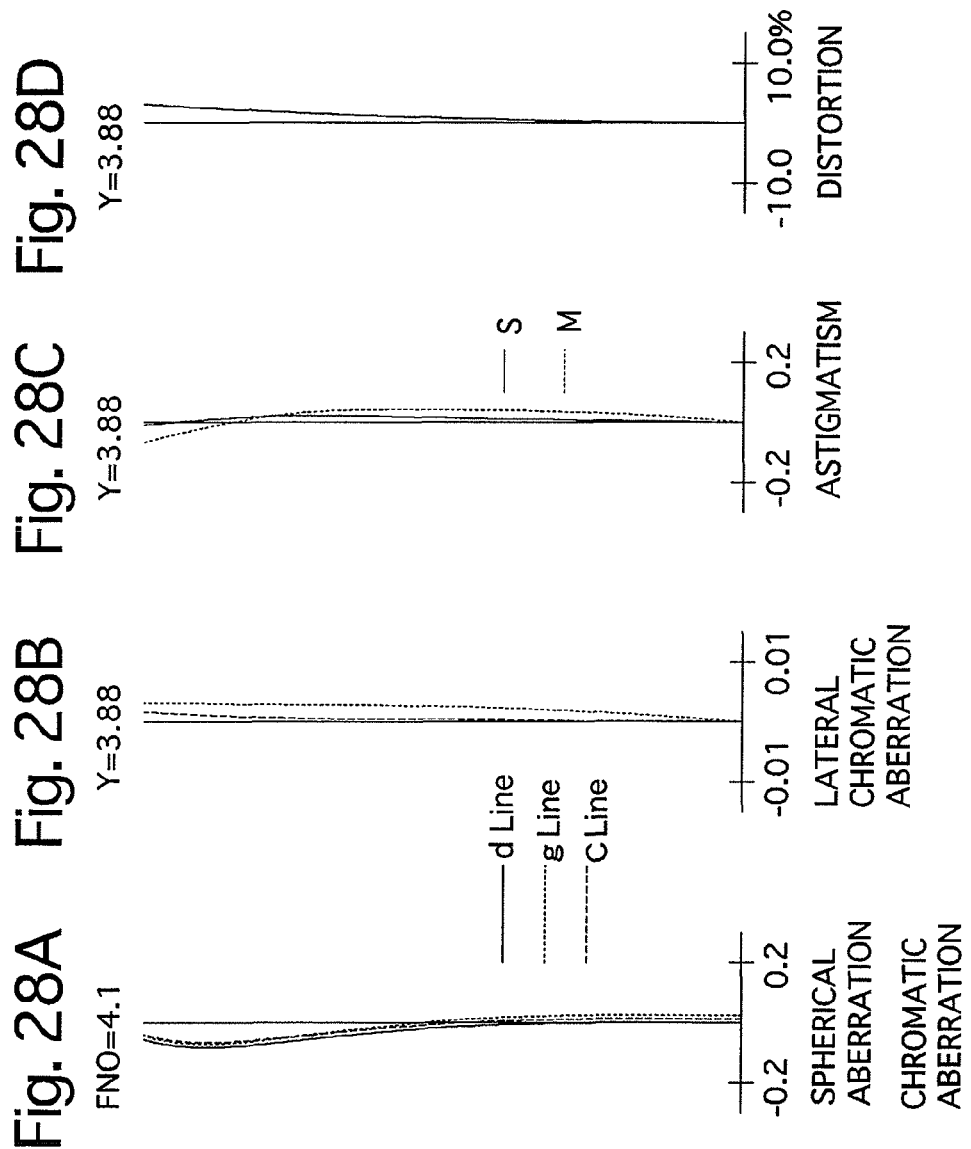
FIGS. 28A, 28B, 28C and 28D show aberrations occurred in the lens arrangement shown in FIG. 27.

FIG. 27 shows the lens arrangement of the zoom lens system, according to a fifth embodiment of the present invention, at an intermediate focal length position, when an object at infinity is in an in-focus state. FIGS. 28A through 28D show aberrations occurred in the lens arrangement shown in FIG. 27.

Figure 29:
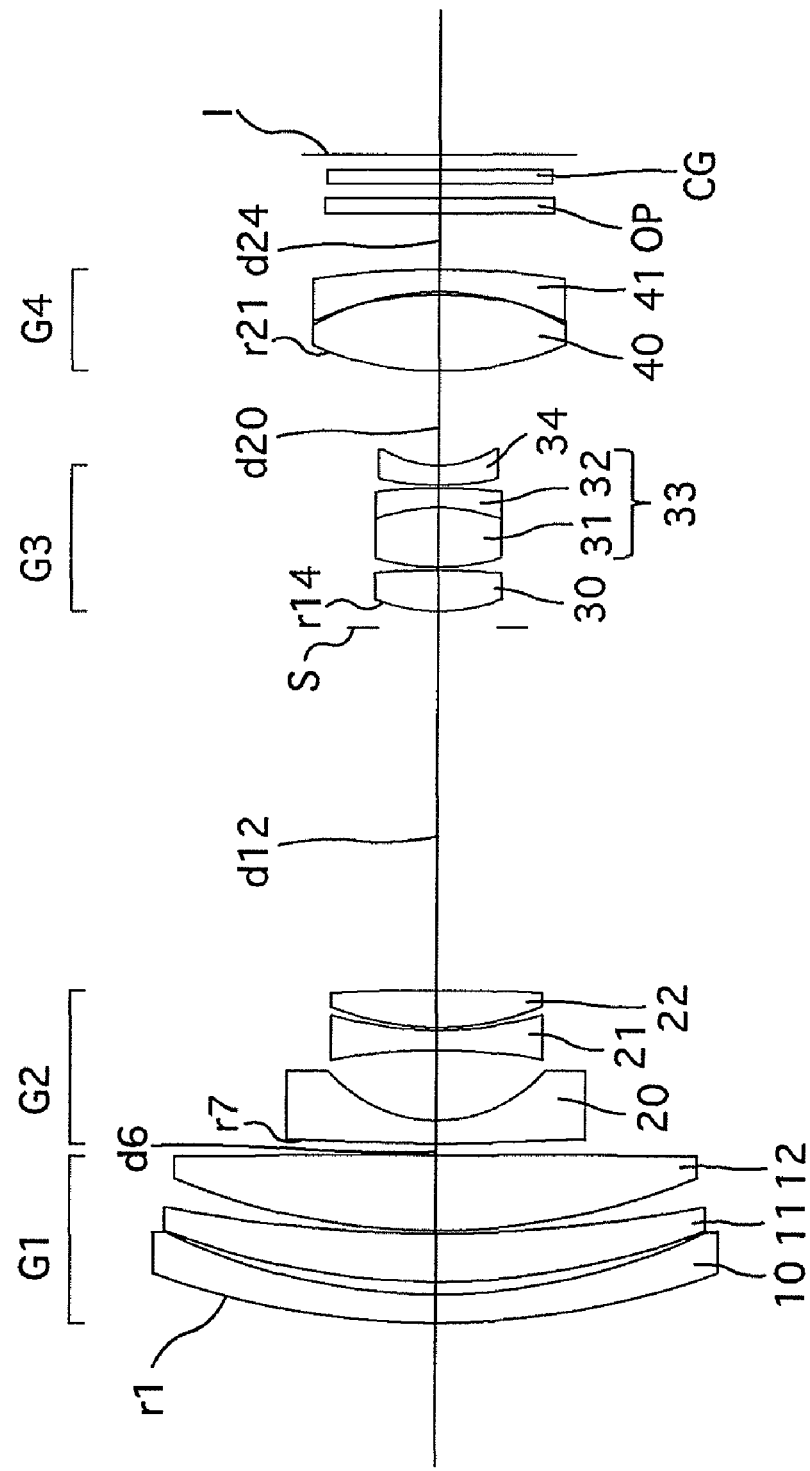
FIG. 29 shows a lens arrangement of the zoom lens system, according to the fifth embodiment of the present invention, at the short focal length extremity, when an object at infinity is in an in-focus state.
Figure 30:
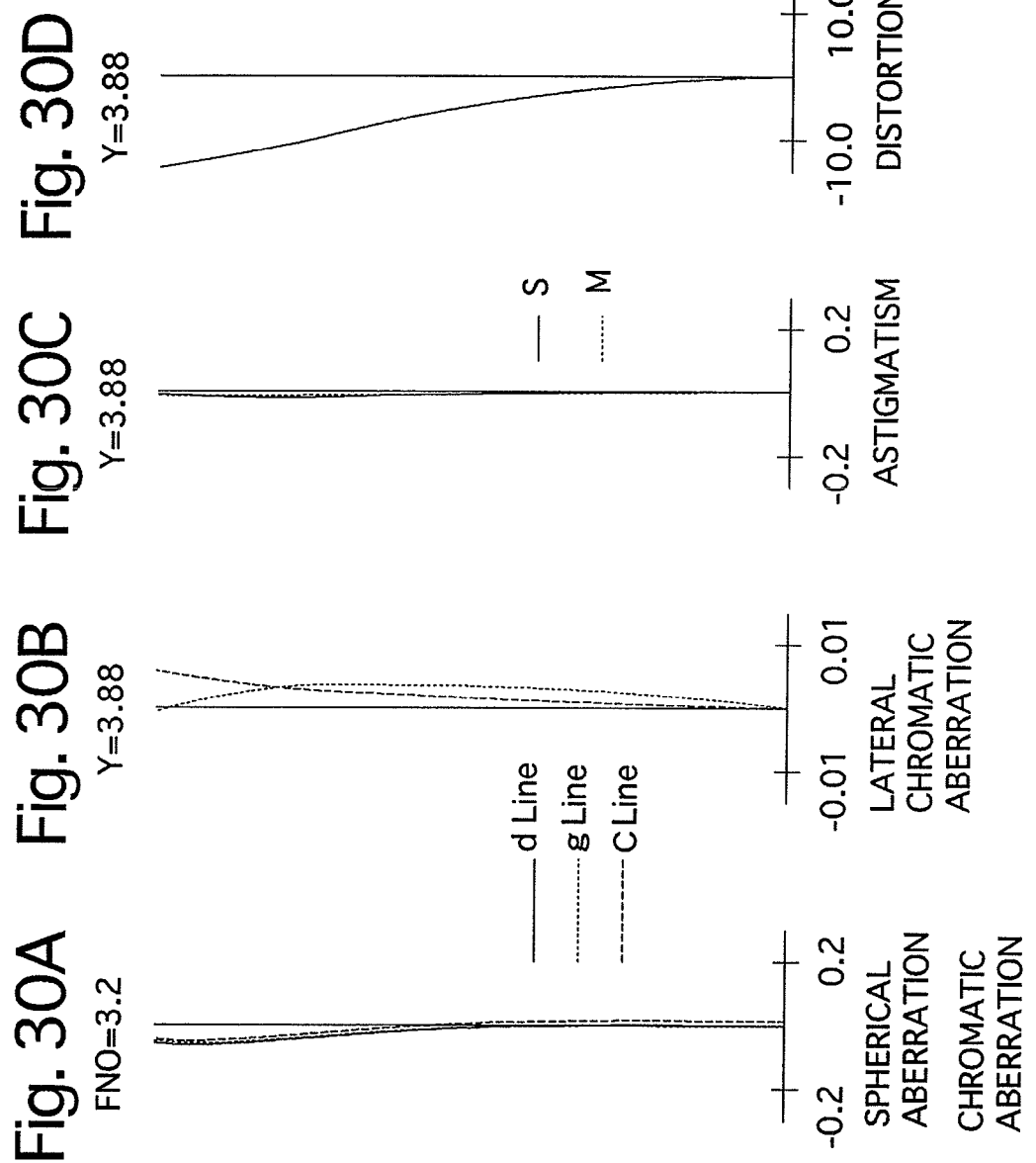
FIGS. 30A, 30B, 30C and 30D show aberrations occurred in the lens arrangement shown in FIG. 29.

FIG. 29 shows the lens arrangement of the zoom lens system, according to the fifth embodiment of the present invention, at the short focal length extremity, when an object at infinity is in an in-focus state. FIGS. 30A through 30D show aberrations occurred in the lens arrangement shown in FIG. 29.

Table 17 shows the lens surface data, Table 18 shows the aspherical surface data, Table 19 shows various zoom lens system data, and Table 20 shows the zoom lens group data of the fifth embodiment.

The lens arrangement of the fifth embodiment is the same as that of the fourth embodiment except that the positive lens element 12 of the positive first lens group G1 is a biconvex positive lens element, and that the negative lens element 41 of the positive fourth lens group G4 is a negative meniscus lens element having the convex surface facing toward the image.

TABLE 17

LENS SURFACE DATA

| Surf. No. | R | d | Nd | vd |
|---|---|---|---|---|
| 1 | 29.611 | 1.000 | 1.92286 | 21.3 |
| 2 | 22.095 | 0.443 | | |
| 3 | 26.460 | 1.678 | 1.49700 | 81.6 |
| 4 | 48.763 | 0.100 | | |
| 5 | 24.258 | 2.649 | 1.61800 | 63.4 |
| 6 | −4209.586 | d6 | | |
| 7 | 105.021 | 0.800 | 1.91082 | 35.2 |
| 8 | 5.212 | 2.472 | | |
| 9 | −20.341 | 0.700 | 1.80400 | 46.6 |
| 10 | 13.858 | 0.100 | | |
| 11 | 10.329 | 1.300 | 1.92286 | 21.3 |
| 12 | −71.010 | d12 | | |
| 13 (Diaphragm) | ∞ | 0.600 | | |
| 14* | 6.189 | 1.450 | 1.58989 | 66.8 |
| 15* | −20.047 | 0.100 | | |
| 16 | 7.753 | 2.100 | 1.48749 | 70.2 |
| 17 | −6.261 | 0.700 | 1.80440 | 39.6 |
| 18 | −17.284 | 0.100 | | |
| 19 | 10.034 | 0.700 | 1.90366 | 31.3 |
| 20 | 3.714 | d20 | | |
| 21* | 11.914 | 2.700 | 1.54358 | 55.7 |
| 22* | −9.766 | 0.100 | | |
| 23* | −8.016 | 0.800 | 1.60641 | 27.2 |
| 24 | −28.291 | d24 | | |
| 25 | ∞ | 0.500 | 1.51633 | 64.1 |
| 26 | ∞ | 0.510 | | |
| 27 | ∞ | 0.500 | 1.51633 | 64.1 |
| 28 | ∞ | — | | |

The symbol * designates the aspherical surface which is rotationally symmetrical with respect to the optical axis.

TABLE 18

ASPHERICAL SURFACE DATA
The aspherical surface coefficients not indicated are zero (0.00)):

| Surf. No. | K | A4 | A6 | A8 | A10 |
|---|---|---|---|---|---|
| 14 | −1.000 | −0.2146 × 10$^{-3}$ | 0.3335 × 10$^{-4}$ | −0.5745 × 10$^{-6}$ | |
| 15 | 0.000 | −0.7449 × 10$^{-4}$ | 0.1565 × 10$^{-4}$ | 0.1049 × 10$^{-5}$ | |
| 21 | 0.000 | 0.5481 × 10$^{-3}$ | −0.6784 × 10$^{-4}$ | 0.2313 × 10$^{-5}$ | |
| 22 | 0.000 | 0.3058 × 10$^{-2}$ | −0.3029 × 10$^{-3}$ | 0.8026 × 10$^{-5}$ | 0.2056 × 10$^{-7}$ |
| 23 | 0.000 | 0.2359 × 10$^{-2}$ | −0.1980 × 10$^{-3}$ | 0.5221 × 10$^{-5}$ | |

TABLE 19

ZOOM LENS SYSTEM DATA
Zoom Ratio 10.30

Short Focal Length Extremity

| | |
|---|---|
| FNO. | 3.2 |
| f | 4.69 |
| W | 44.0 |
| Y | 3.88 |
| fB | 0.59 |
| L | 41.22 |
| d6 | 0.410 |
| d12 | 12.783 |
| d20 | 3.331 |
| d24 | 2.000 |

Intermediate Focal Length

| | |
|---|---|
| FNO. | 4.1 |
| f | 11.90 |
| W | 17.5 |
| Y | 3.88 |
| fB | 0.59 |
| L | 46.55 |
| d6 | 9.997 |
| d12 | 4.846 |
| d20 | 3.029 |
| d24 | 5.991 |

Long Focal Length Extremity

| | |
|---|---|
| FNO. | 6.4 |
| f | 48.30 |
| W | 4.5 |
| Y | 3.88 |
| fB | 0.59 |
| L | 67.00 |
| d6 | 23.357 |
| d12 | 0.900 |
| d20 | 17.315 |
| d24 | 2.737 |

TABLE 20

ZOOM LENS GROUP DATA

| Lens Group | First Surface | Focal Length |
|---|---|---|
| 1 | 1 | 42.13 |
| 2 | 7 | −6.66 |
| 3 | 14 | 9.46 |
| 4 | 21 | 21.19 |

The numerical values of each condition for each embodiment are shown in Table 21.

TABLE 21

| | Embod. 1 | Embod. 2 | Embod. 3 |
|---|---|---|---|
| Condition (1) | 3.347 | 3.221 | 3.099 |
| Condition (2) | 28.500 | 28.500 | 28.500 |
| Condition (3) | −6.485 | −5.972 | −5.896 |
| Condition (4) | −0.690 | −0.678 | −0.683 |
| Condition (5) | 17.98 | 17.98 | 17.98 |
| Condition (6) | 31.31 | 20.88 | 20.88 |
| Condition (7) | 1.90366 | 1.90366 | 1.86883 |

| | Embod. 4 | Embod. 5 |
|---|---|---|
| Condition (1) | 3.171 | 3.874 |
| Condition (2) | 28.500 | 28.500 |
| Condition (3) | −5.869 | −6.330 |
| Condition (4) | −0.674 | −0.703 |
| Condition (5) | 21.29 | 21.29 |
| Condition (6) | 21.29 | 21.29 |
| Condition (7) | 1.85403 | 1.85403 |

As can be understood from Table 21, the first embodiments satisfy conditions (1) through (5), and condition (7), and the second through fifth embodiments satisfy conditions (1) through (7). Furthermore, as can be understood from the aberration diagrams, the various aberrations are suitably corrected.

According to the present invention, a zoom lens system, which is ideal for use in a retractable (telescoping) lens of a camera and has the following features, can be attained:

a zoom ratio is approximately 10:1;

an angle-of-view is 70 degrees or more at the short focal length extremity;

the diameter of the frontmost lens element is smaller; and the overall length of the zoom lens system at the short focal length extremity is shorter.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A zoom lens system comprises a positive first lens group, a negative second lens group, a positive third lens group, and a positive fourth lens group, in this order from an object, wherein upon zooming from the short focal length extremity to the long focal length extremity, all of said first through fourth lens groups move along the optical axis; and wherein said zoom lens system satisfies the following condition:

$$3 < T1/|F2| < 4$$

wherein

T1 designates the traveling distance of said positive first lens group upon zooming from the short focal length extremity to the long focal length extremity; and F2 designates the focal length of said negative second lens group.

2. The zoom lens system according to claim 1, wherein said positive fourth lens group that is arranged to move upon both zooming and focusing comprises a positive lens element provided with at least one aspherical surface, and a negative lens element provided with at least one aspherical surface, in this order from the object, and wherein said positive fourth lens group satisfies the following condition:

$$\nu a - \nu b > 25$$

wherein

νa designates the Abbe number, with respect to the d-line, of said positive lens element of said positive fourth lens group; and νb designates the Abbe number, with respect to the d-line, of said negative lens element of said positive fourth lens group.

3. The zoom lens system according to claim 1, further satisfies the following conditions:

$$-7 < F1/F2 < -5$$

$$-0.72 < F2/F3 < -0.50$$

wherein

F1 designates the focal length of said positive first lens group;

F2 designates the focal length of said negative second lens group; and

F3 designates the focal length of said positive third lens group.

4. The zoom lens system according to claim 1, wherein said negative second lens group comprises a negative lens element provided with at least one aspherical surface, a negative lens element, and a positive lens element, in this order from the object, wherein said negative second lens group satisfies the following condition:

$$\nu c < 23$$

wherein

νc designates the Abbe number, with respect to the d-line, of said positive lens element provided in said negative second lens group.

5. The zoom lens system according to claim 1, wherein said positive first lens group comprises a negative lens element and at least one positive lens element, in this order from the object, wherein said positive first lens group satisfies the following condition:

$$\nu d < 23$$

wherein

νd designates the Abbe number, with respect to the d-line, of the most object-side negative lens element in said positive first lens group.

6. The zoom lens system according to claim 1, wherein said positive third lens group comprises a positive lens element provided with at least one aspherical surface, a cemented lens having a positive lens element and a negative lens element in this order from the object, and a negative lens element, in this order from the object, wherein said positive third lens group satisfies the following condition:

$$Na > 1.85$$

wherein

Na designates the average value of the refractive index with respect to the d-line of said two negative lens elements in said positive third lens group.

7. The zoom lens system according to claim 1, wherein at least said negative second lens group moves toward an image while following a convex-shaped curved path facing toward the image, and said positive fourth lens group first moves toward the object and thereafter moves toward the image.

* * * * *